Figure 7:
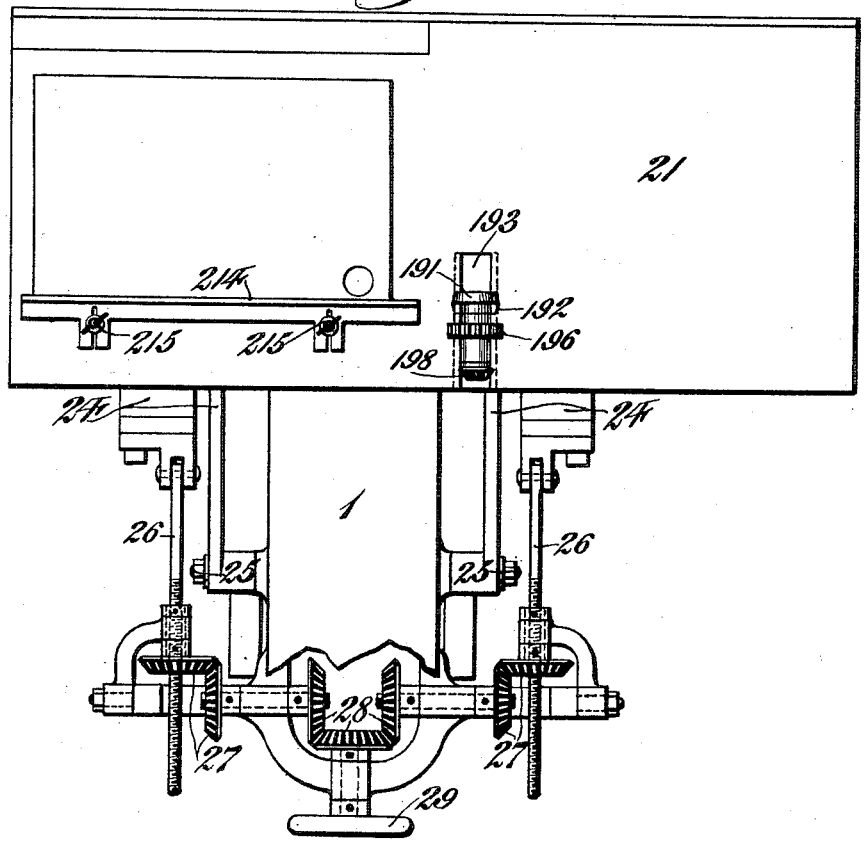

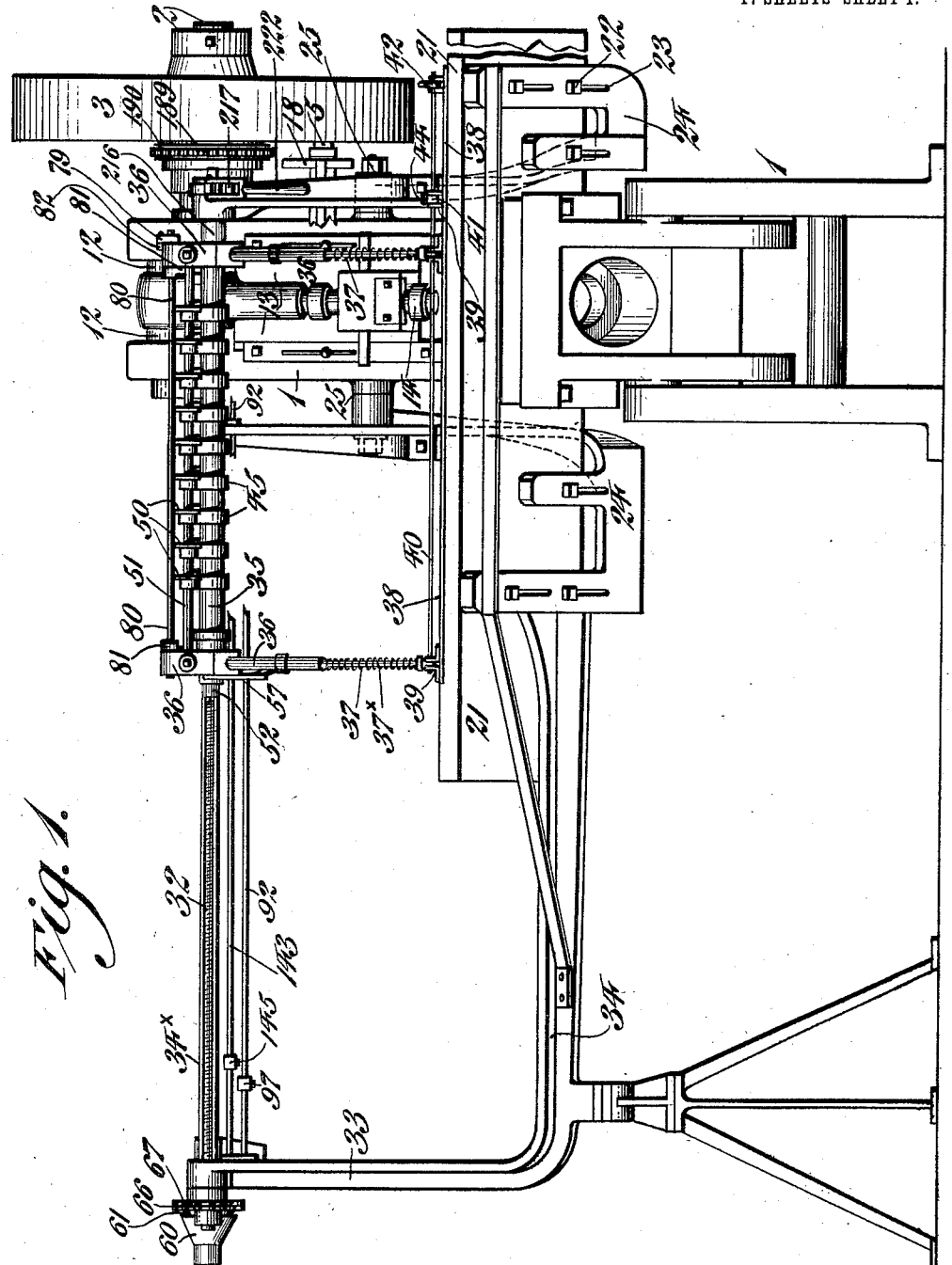

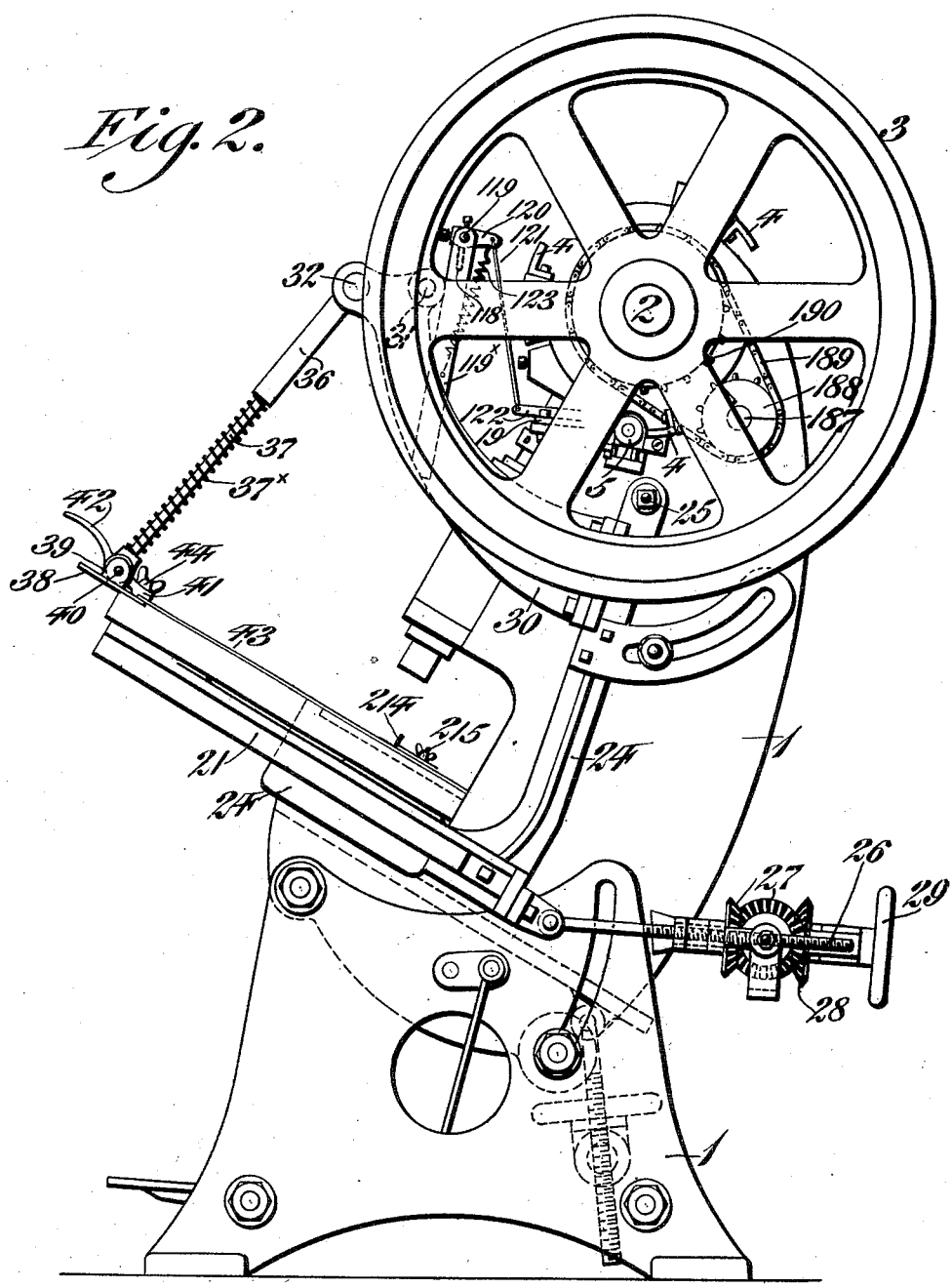

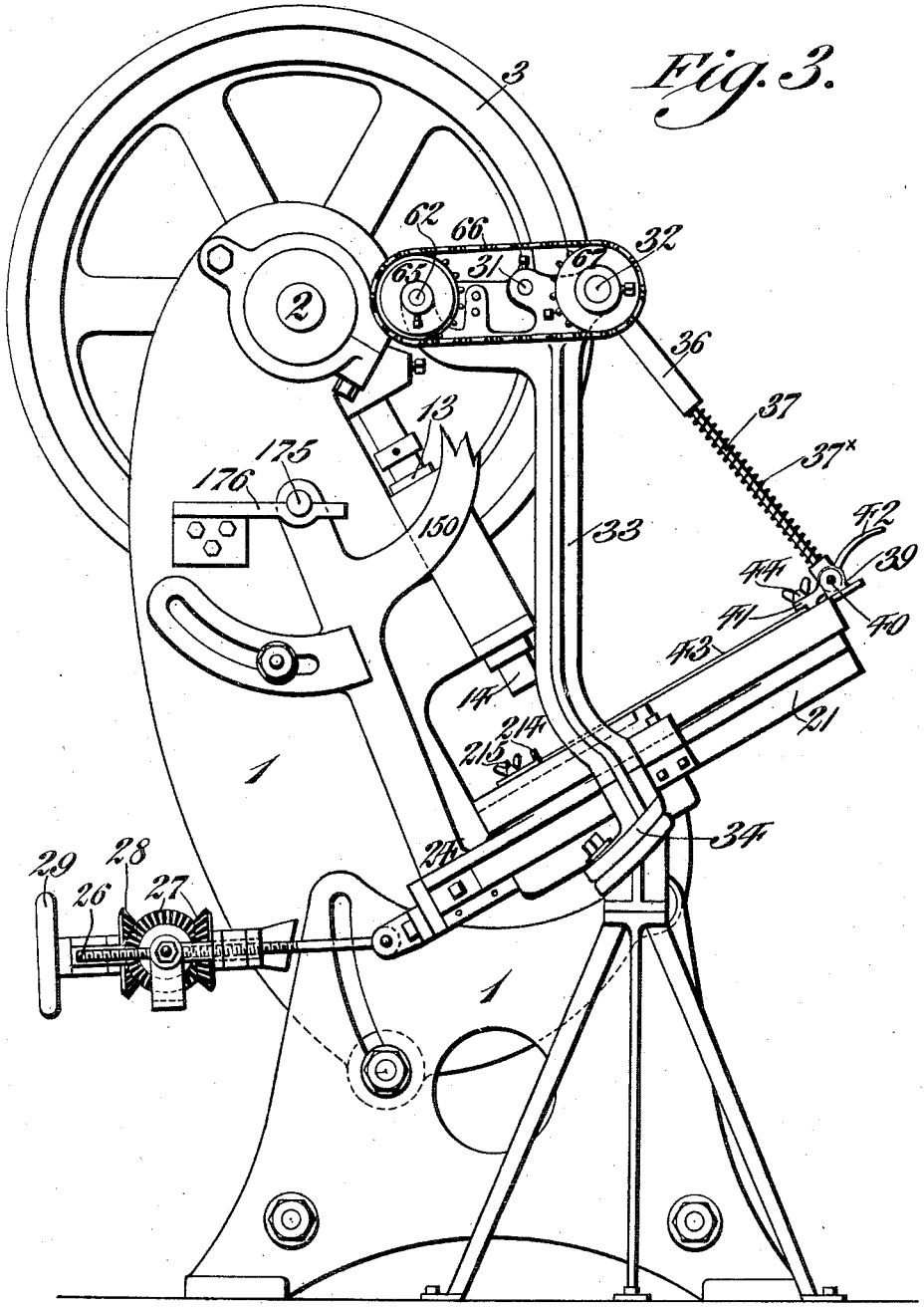

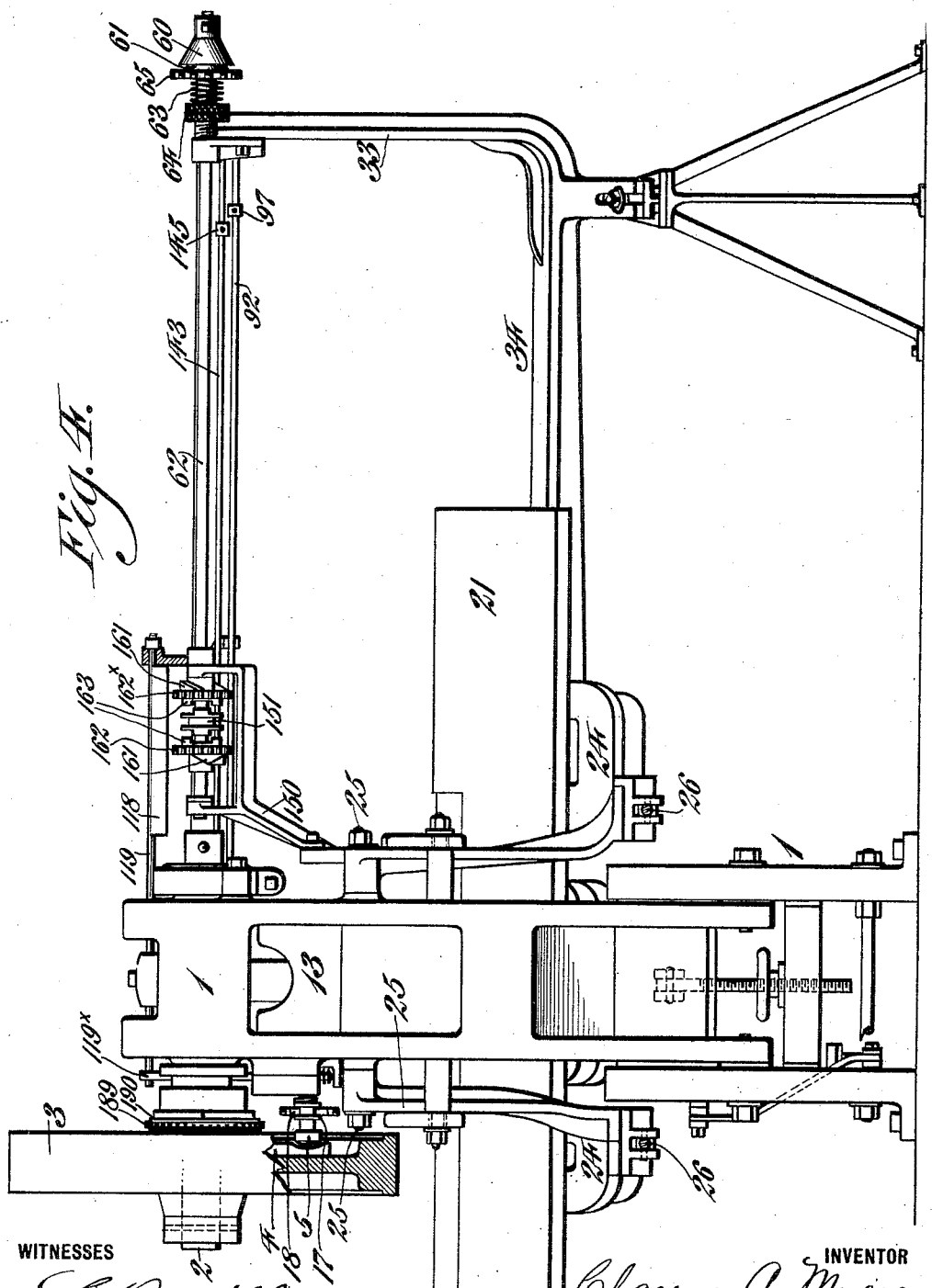

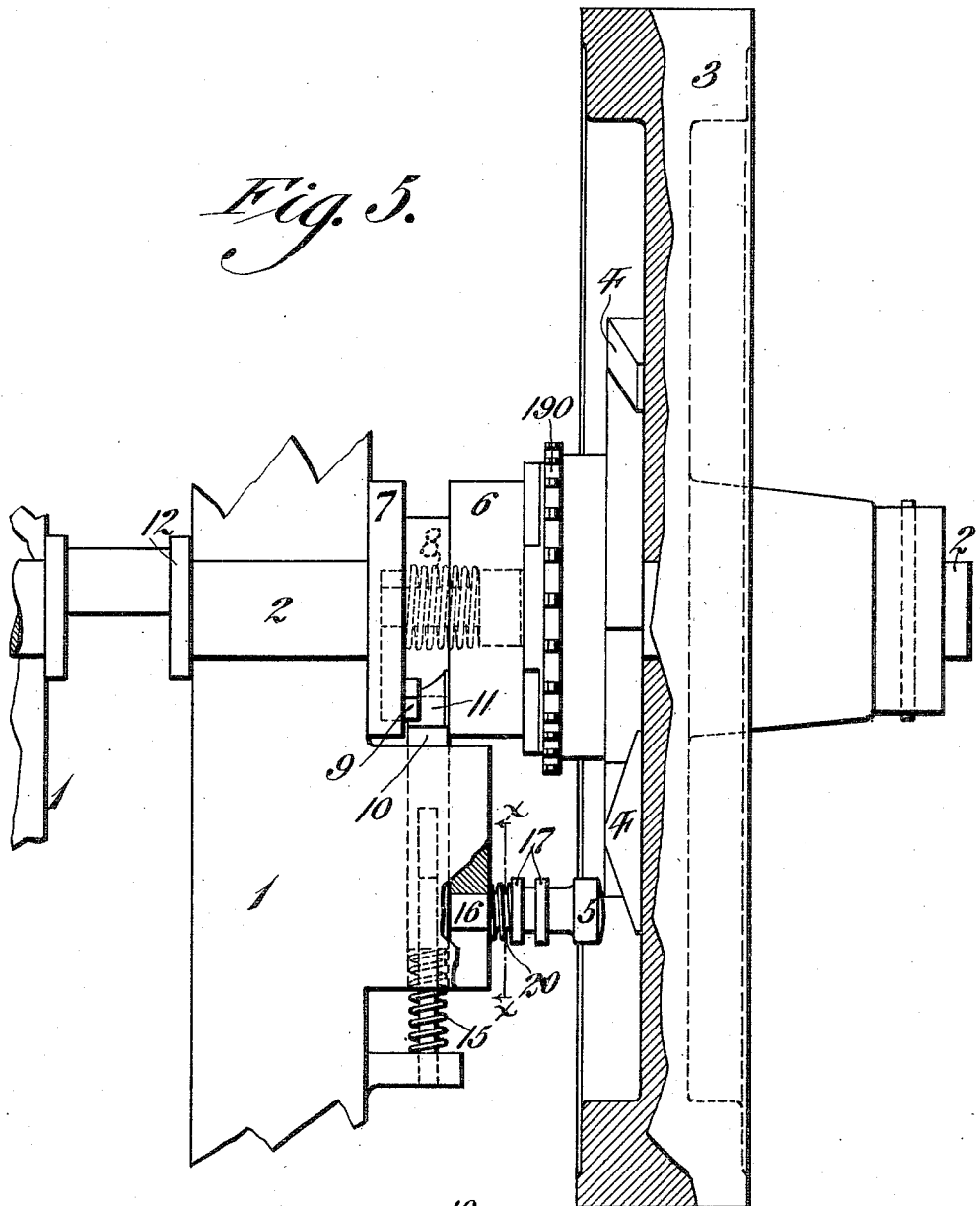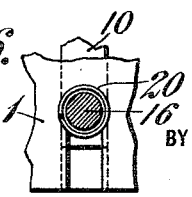

C. A. MYERS.
STAMPING MACHINE.
APPLICATION FILED MAY 6, 1911.

1,006,117.

Patented Oct. 17, 1911.
17 SHEETS—SHEET 6.

WITNESSES
L. Couville,
P. F. Nagle.

INVENTOR
Clarence A. Myers.
BY Wiedersheim & Fairbanks.
ATTORNEYS

COLUMBIA PLANOGRAPH CO., WASHINGTON, D. C.

C. A. MYERS.
STAMPING MACHINE.
APPLICATION FILED MAY 6, 1911.
1,006,117.
Patented Oct. 17, 1911.
17 SHEETS—SHEET 7.
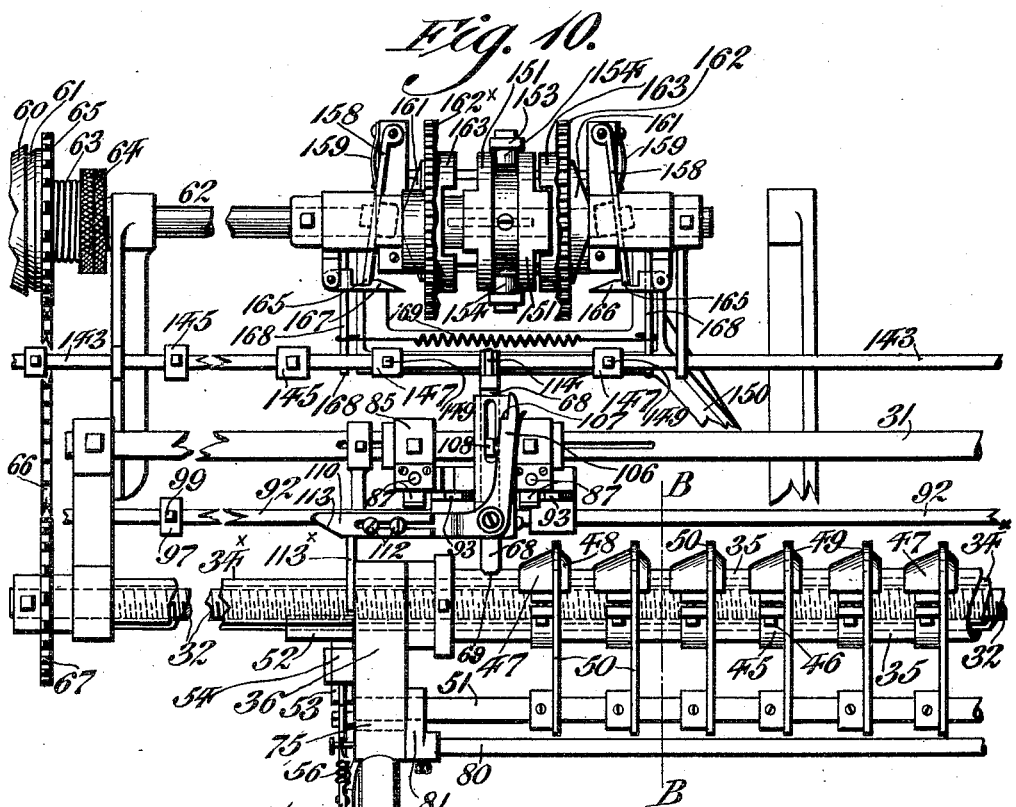
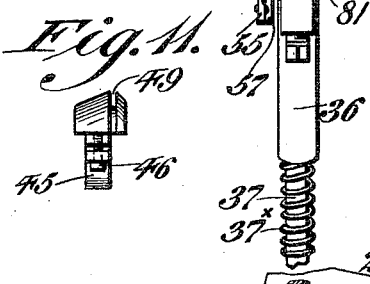
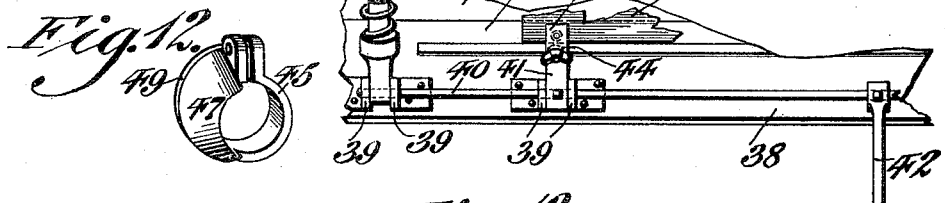
WITNESSES
L. Douville,
P. F. Nagle.
INVENTOR
Clarence A. Myers,
BY Wiedersheim & Fairbanks,
ATTORNEYS

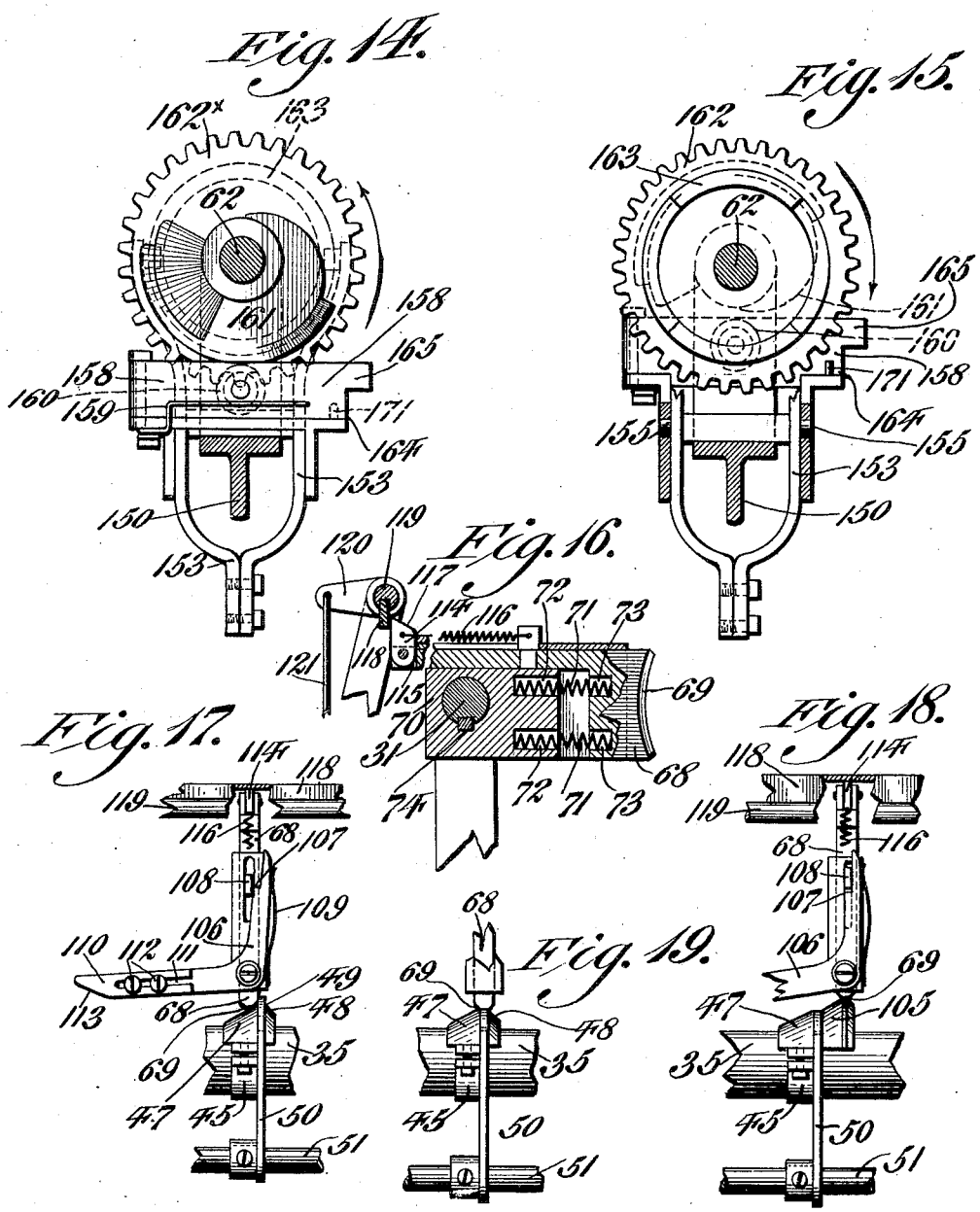

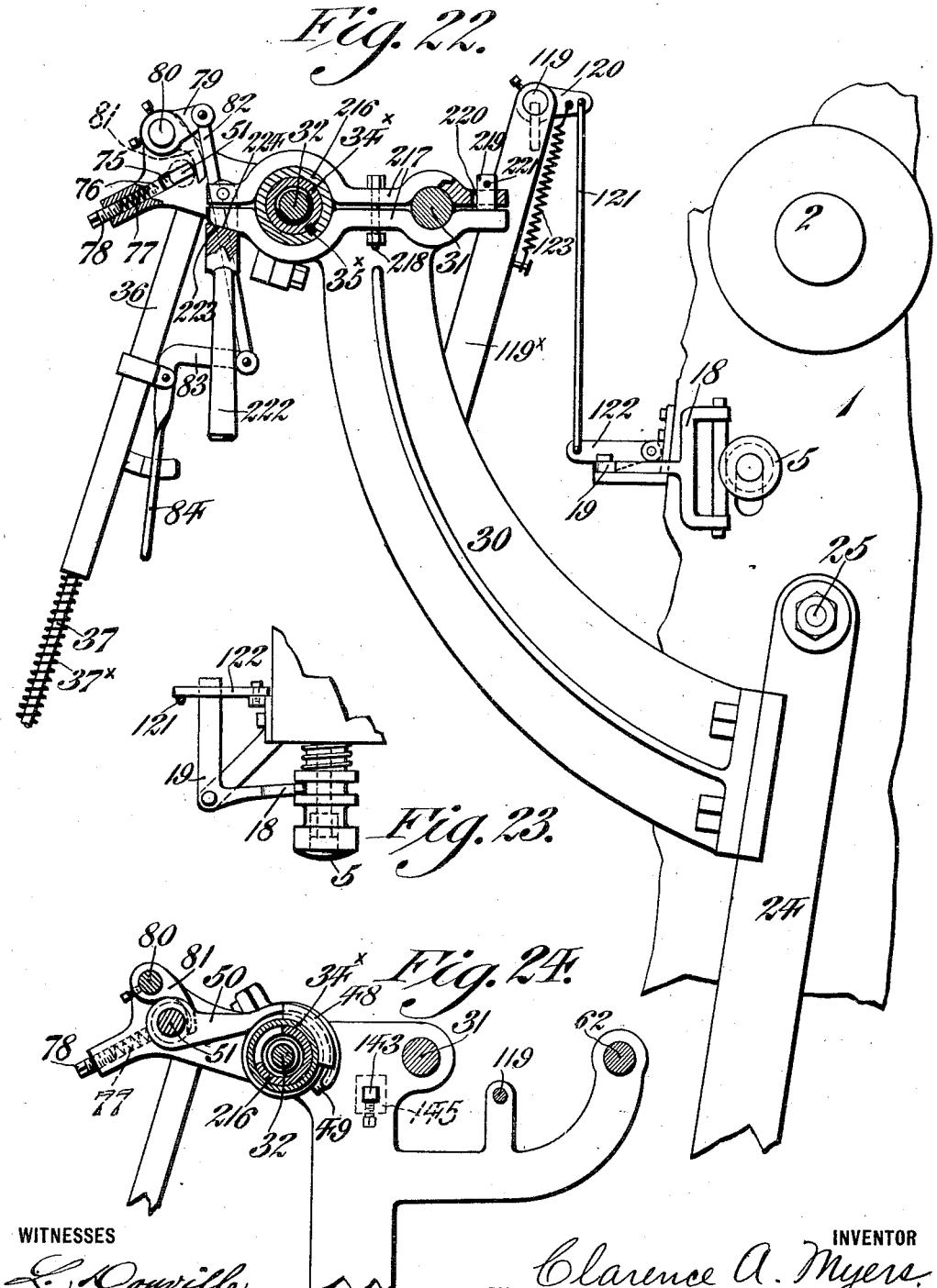

C. A. MYERS.
STAMPING MACHINE.
APPLICATION FILED MAY 6, 1911.

1,006,117.

Patented Oct. 17, 1911.
17 SHEETS—SHEET 10.

Fig. 25.

WITNESSES

INVENTOR
Clarence A. Myers
BY Wiedersheim & Fairbanks
ATTORNEYS

C. A. MYERS.
STAMPING MACHINE.
APPLICATION FILED MAY 6, 1911.

1,006,117.

Patented Oct. 17, 1911.
17 SHEETS—SHEET 11.

C. A. MYERS.
STAMPING MACHINE.
APPLICATION FILED MAY 6, 1911.
1,006,117.
Patented Oct. 17, 1911.
17 SHEETS—SHEET 12.
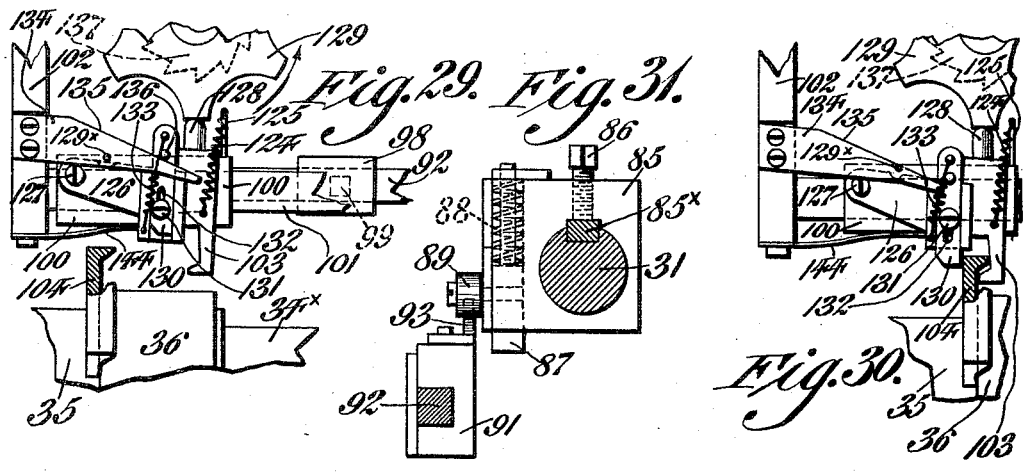
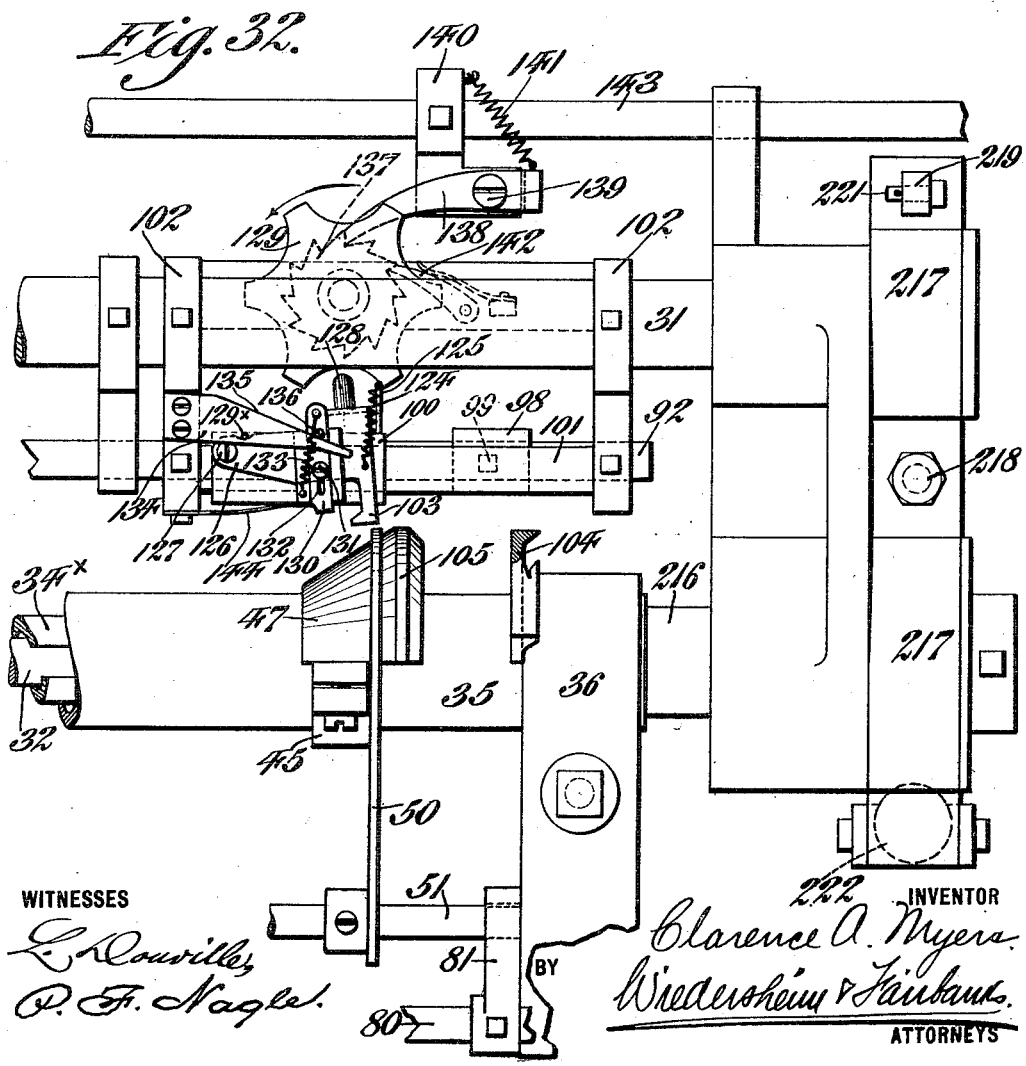

C. A. MYERS.
STAMPING MACHINE.
APPLICATION FILED MAY 6, 1911.
1,006,117.
Patented Oct. 17, 1911.
17 SHEETS—SHEET 13.
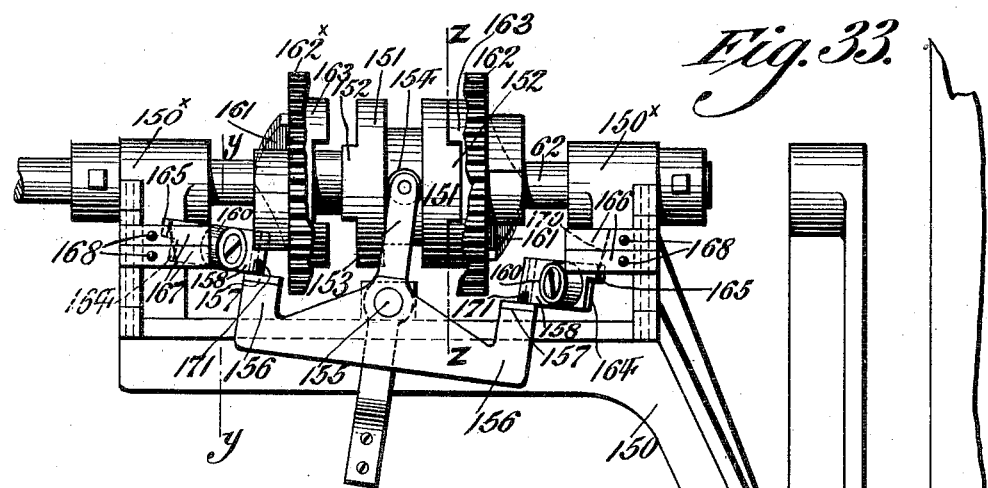
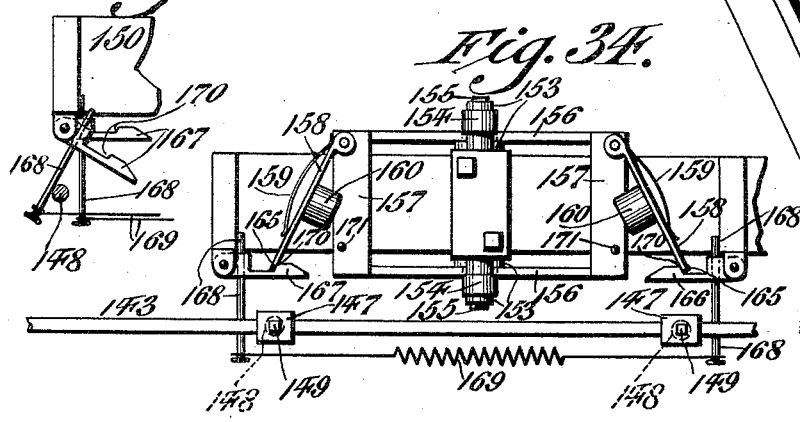
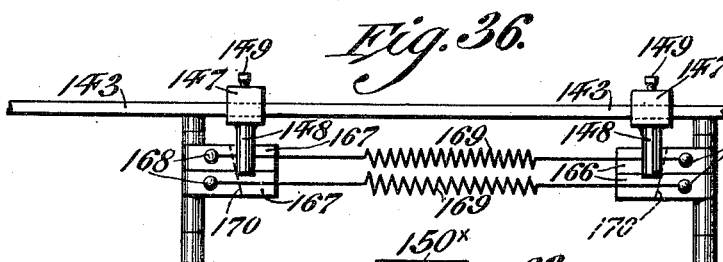
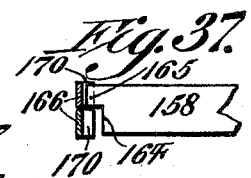
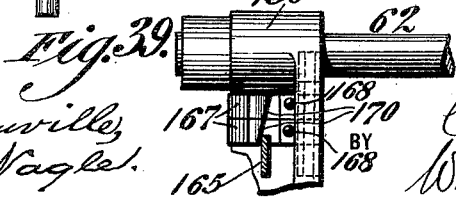
WITNESSES
INVENTOR
Clarence A. Myers,
BY
Wiederoheim & Fairbank
ATTORNEYS

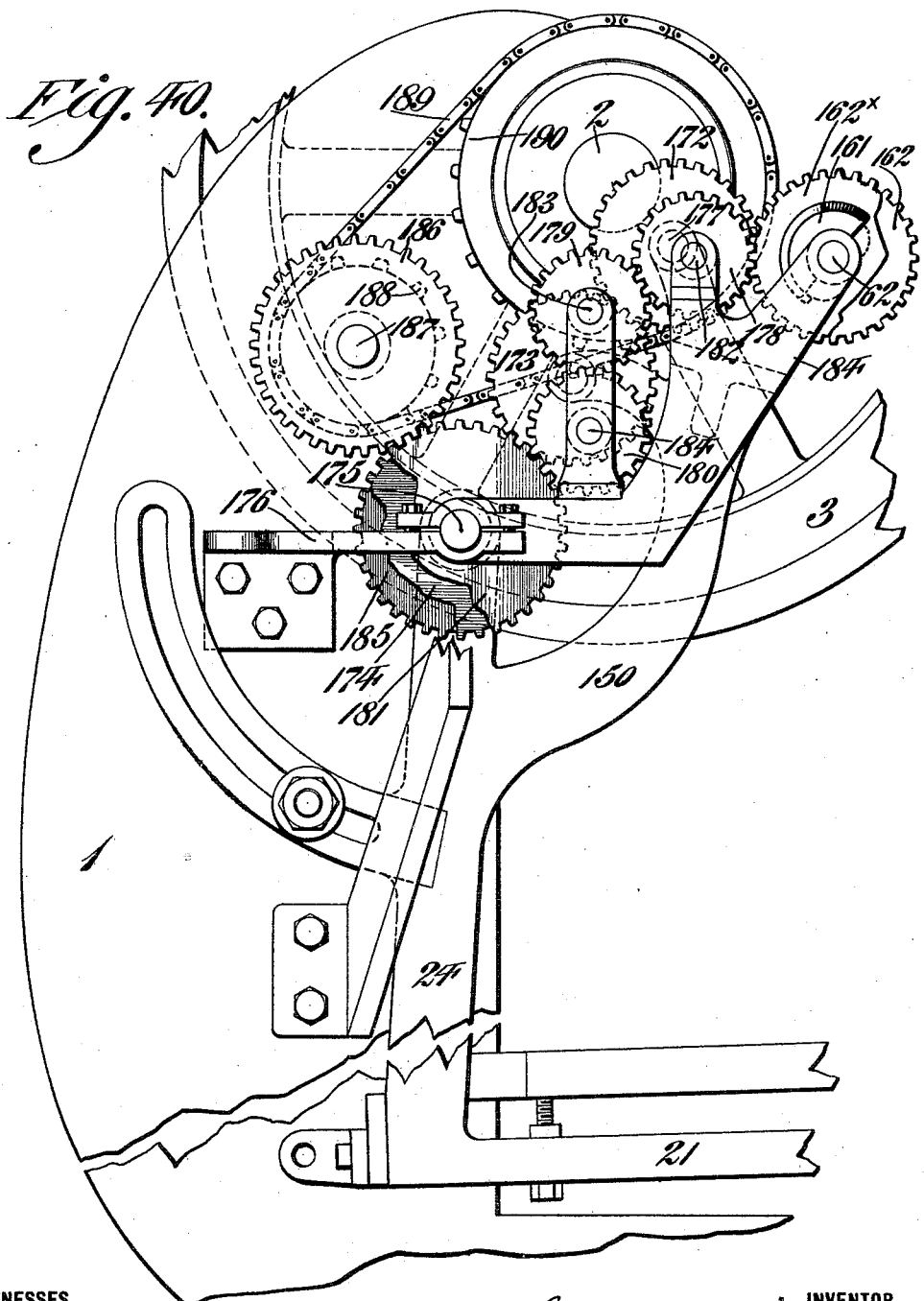

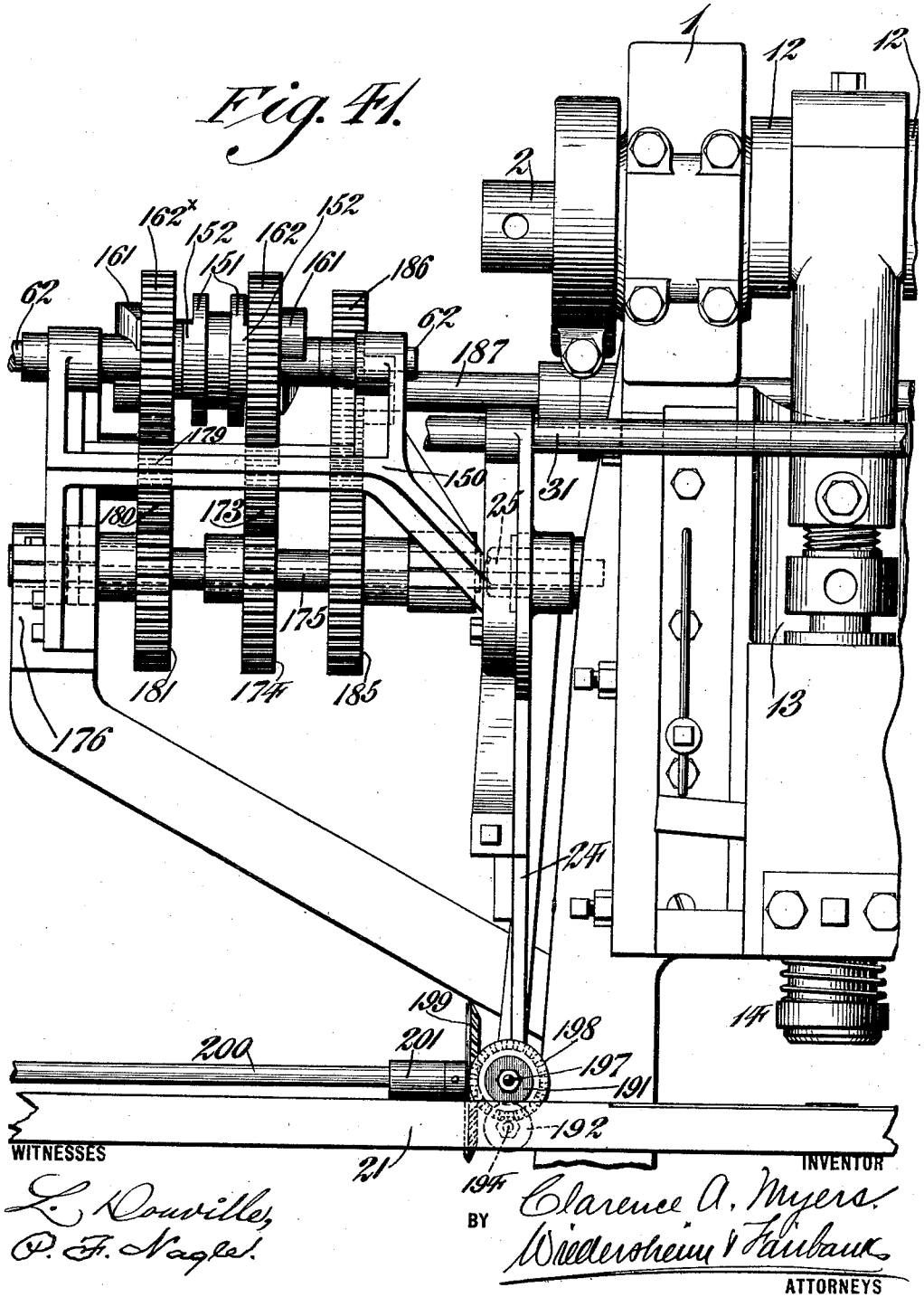

C. A. MYERS.
STAMPING MACHINE.
APPLICATION FILED MAY 6, 1911.

1,006,117.

Patented Oct. 17, 1911.
17 SHEETS—SHEET 16.

WITNESSES
L. Douville,
P. F. Nagle.

INVENTOR
Clarence A. Myers.
BY Wiedersheim & Fairbanks
ATTORNEYS

C. A. MYERS.
STAMPING MACHINE.
APPLICATION FILED MAY 6, 1911.

1,006,117.

Patented Oct. 17, 1911.
17 SHEETS—SHEET 17.

WITNESSES
L. Donville,
P. F. Nagle

INVENTOR
Clarence A. Myers
BY Wiedersheim & Fairbanks
ATTORNEYS

UNITED STATES PATENT OFFICE.

CLARENCE A. MYERS, OF CAMDEN, NEW JERSEY.

STAMPING-MACHINE.

1,006,117.  Specification of Letters Patent.  Patented Oct. 17, 1911.

Application filed May 6, 1911. Serial No. 625,542.

*To all whom it may concern:*

Be it known that I, CLARENCE A. MYERS, a citizen of the United States, residing at Camden, county of Camden, State of New Jersey, have invented a new and useful Stamping-Machine, of which the following is a specification.

This invention relates to a stamping and punching machine and more particularly to a machine adapted to operate upon a sheet of material and stamp suitable punchings therefrom in a series of rows each of which is staggered with respect to the next adjacent row whereby the loss of material is reduced to a minimum.

It has for an object to provide a machine operating automatically to perform the stamping or punching operation and wherein a step by step movement of the material carrying mechanism takes place in a regular and predetermined sequence of operation and wherein the carrier feeding means is controlled automatically to effect movement of the material in either direction and which reverses at both ends of the feeding stroke without the aid of the operator.

It has for a further object to provide a punching machine wherein a row of punches are stamped automatically after which the machine reverses and either returns to the starting point to stamp a second row of punches staggered with relation to the first or punches the second row on the return stroke.

It has for a still further object to provide a means for regulating and adjusting the distance between the punches and with which certain adjuncts coöperate to automatically determine the staggered relation of one row of punches to another.

It has for a still further object to provide a novel form of clutch mechanism whereby the forward feeding and reverse feeding movements of the material carrier may be automatically, accurately and positively controlled.

It has for a further object to provide a novel form of step by step mechanism wherein the feeding mechanism is temporarily disconnected from the material carrier during a stamping or punching operation and automatically becomes operative to continue the feeding as soon as the machine has stamped out a single punch.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 8:
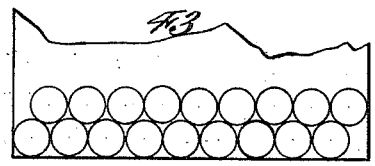
Figure 9:
Figure 26:
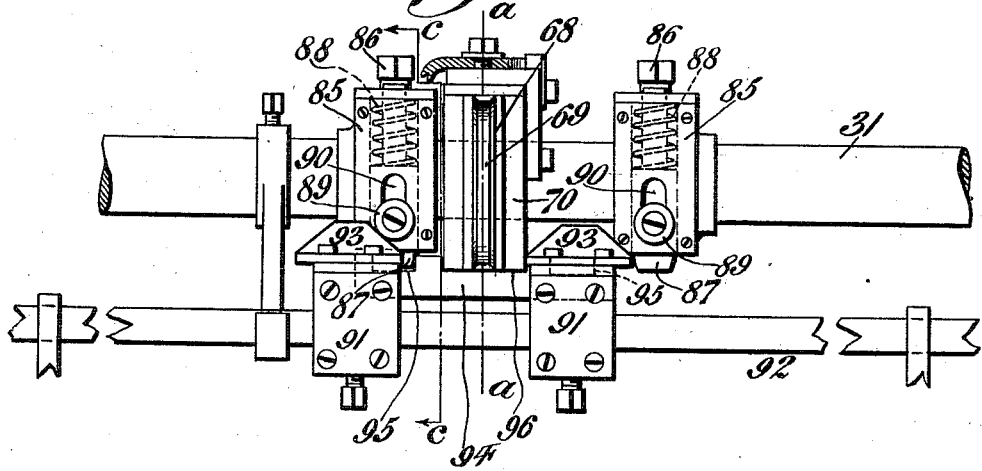
Figure 27:
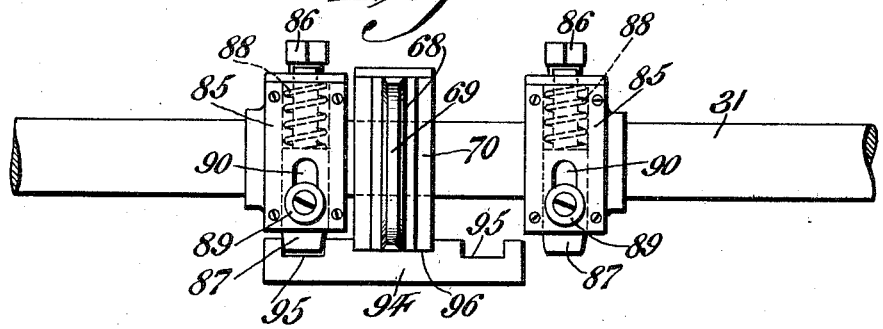
Figure 28:
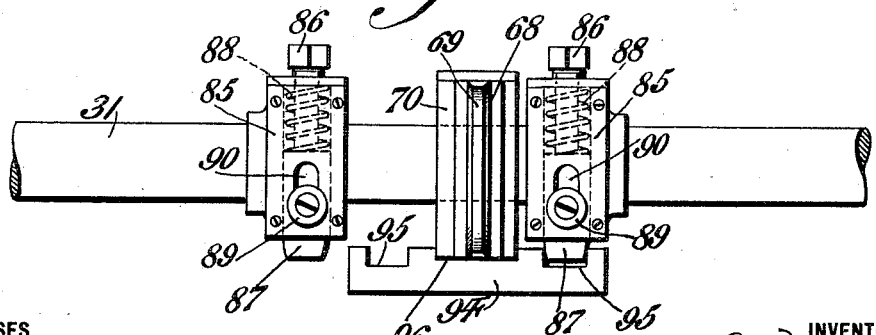
Figure 46:
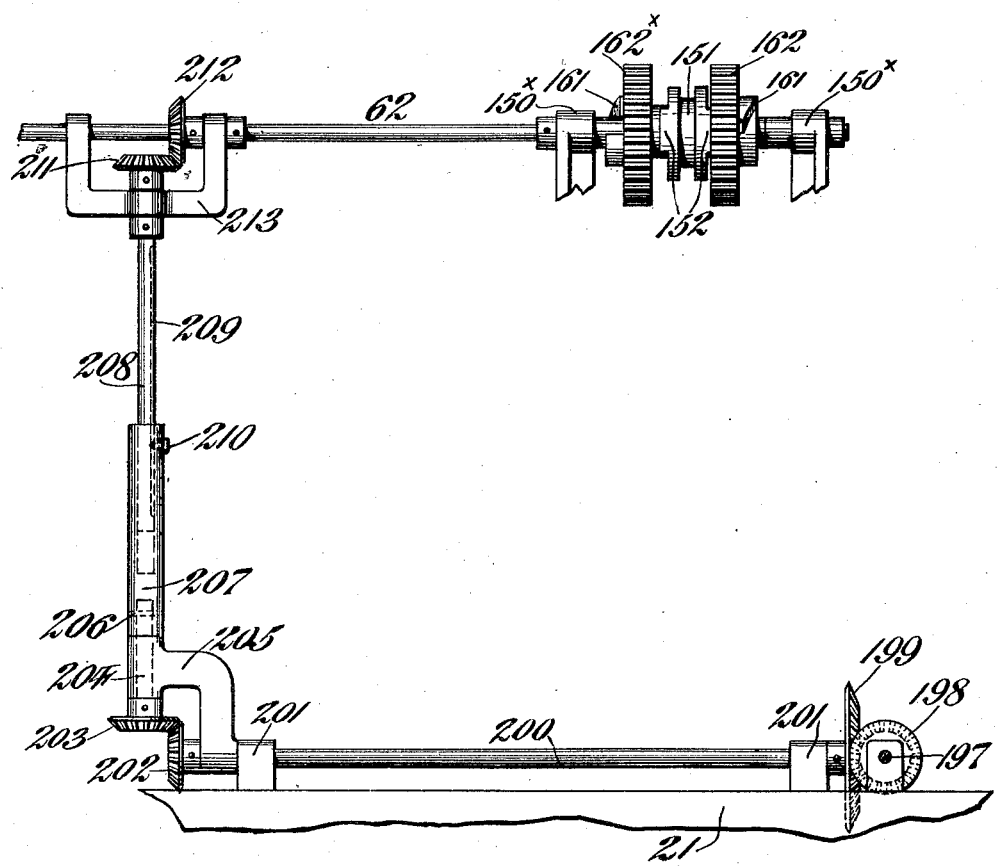
Figures 47, 48:
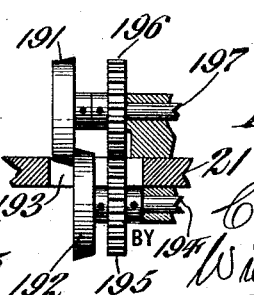

Referring to the drawings, Figure 1 represents a front elevation of a stamping and punching machine embodying my invention. Fig. 2 represents a side elevation of one side of the same. Fig. 3 represents a side elevation of the opposite side of the same machine. Fig. 4 represents a rear elevation of the same machine. Fig. 5 represents a detail of the driving clutch mechanism controlling the punching mechanism, certain parts being shown in section. Fig. 6 represents a sectional detail on line $x$—$x$ Fig. 5. Fig. 7 represents a plan of the machine bed and its shifting mechanism. Fig. 8 represents a portion of a strip of material illustrating the staggered relation of the rows of punchings. Fig. 9 represents a portion of a strip of material illustrating the function of the trimmers or cutters. Fig. 10 represents a plan of a portion of the machine showing the step by step mechanism and feed controlling clutch. Figs. 11 and 12 represent details of the collars used in connection with the step by step mechanism. Fig. 13 represents a side elevation of one of the stop members forming an adjunct of the step by step mechanism. Fig. 14 represents a section on line $y$—$y$ Fig. 33. Fig. 15 represents a section on line $z$—$z$ Fig. 33 of the feed controlling clutch. Fig. 16 represents a section on line $a$—$a$ Fig. 26. Fig. 17 represents a detail of a portion of the step by step mechanism showing the control block engaging a stop finger in which position a punching operation takes place. Fig. 18 represents a view of the same in engagement with the cam which causes the control block to be locked out of operative position. Fig. 19 represents a portion of the mechanism shown in Fig. 17 with the stop finger in position to release the control block. Figs. 20 and 21 represent, respectively, positions of a stop finger relative to the collars of the step by step mechanism. Fig. 22 represents a side elevation, partly in section, of the material carrier supporting means and the main drive clutch trip mechanism. Fig. 23 represents a detail in plan of the cam roller and its shifting means, the said parts forming a portion of the clutch mechanism for operating a punching tool. Fig. 24 represents a section on line B—B Fig. 10. Fig. 25 represents a side elevation, partly in section, of the material carrier supporting mechanism showing the means for feeding the same and also the trip mechanism for operating the stamping clutch. Fig. 26 represents a detail in elevation of the control block of the step by step mechanism and its adjuncts. Figs. 27 and 28 represent similar views showing the control block in different positions. Fig. 29 represents a detail of the control block resetting mechanism in one position. Fig. 30 represents the same engaged by the resetting finger of the material carrier. Fig. 31 represents a section on line c—c Fig. 26. Fig. 32 represents a plan of the control block resetting mechanism and its coöperating adjuncts. Fig. 33 represents an elevation of the feed controlling clutch mechanism. Fig. 34 represents a plan of the clutch operating lever and its adjuncts. Fig. 35 represents a detail of the trip locking mechanism controlling the clutch operating lever. Fig. 36 represents in elevation the tripping mechanism controlling the clutch operating lever. Figs. 37 and 38 represent details of a portion of the arm carrying the clutch cam roller and showing in section the trip members holding the same in different positions. Fig. 39 represents a detail of the same. Fig. 40 represents a side elevation of the chain of gears for operating the feed clutch mechanism. Fig. 41 represents an elevation of the same showing a portion of the cutter mechanism. Fig. 42 represents a plan of the same gearing showing the connection to the main drive shaft. Figs. 43, 44 and 45 represent the material in various stages of operation. Fig. 46 represents a detail of the mechanism for driving the trimmers or cutters. Fig. 47 represents an end elevation of the trimmers or cutters the same being broken away to show the driving gear. Fig. 48 represents a side elevation of the same.

Similar numerals of reference indicate corresponding parts in the figures.

1 designates the frame of a stamping or punching machine, the same being of suitable construction for the purpose intended and having in connection therewith the combination of novel adjuncts adapted to perform a stamping or punching operation, simply, economically and rapidly. The frame 1 has rotatably mounted thereon a main shaft 2 carrying a pulley 3 loosely mounted and driven from any suitable source of power the said pulley 3 being provided with a cam 4 adapted to engage a cam roller 5 for causing operation of a suitable clutch mechanism for operating the stamping or punching tool. This clutch mechanism consists of a disk member 6 fixedly secured to the pulley 3 and positioned opposite a second disk member 7 suitably keyed or otherwise secured to the shaft 2, these two disks being held in normal position by means of a spring 8 or the like. Secured to the disk 7 is a movable lug 9 normally held out of engagement with the disk 6 by means of a plunger 10 having a cam faced end 11 coöperating with the lug 9 and maintaining it in the position shown in Fig. 5. Removal of the plunger 10 from engagement with the lug 9 causes the latter to spring into engagement with the clutch face 6 and thereby impart movement to the disk 7 and shaft 2, which latter, as will be apparent, drives the crank 12, carrying the cross-head 13, to which the holder 14 of the stamping tool is connected. The plunger 10 is slidingly mounted in the frame 1 and is actuated in one direction by a spring 15 which has a tendency to hold the same normally in the path of the lug 9 to prevent movement being transmitted to the shaft 2 at certain times and the plunger is withdrawn intermittently through the medium of the cam roller 5. This cam roller 5 is keyed to and slidingly mounted on a spindle 16 attached to the plunger 10 and is also provided with a slotted collar 17, to which is secured the bifurcated end 18 of an operating lever 19, the latter being intermittently actuated through suitable mechanism hereinafter to be described. The actuating lever 19 normally holds the cam roller 5 out of engagement with the cam 4 and against the tension of a spring 20 and as soon as this lever 19 is released, the spring 20 causes the roller 5 to snap into position for engagement with the cam and cause the actuation of the punching mechanism.

21 designates a suitable bed, preferably adjustably mounted by means of bolts 22 and slots 23 on the bracket arms 24, which latter are suitably pivoted at 25 to the frame 1 of the machine whereby the bed 21 and its adjuncts may be swung away from the machine in order to permit access to the punch and adjacent parts for whatever purpose may be desired. This swinging movement is accomplished, in the present instance, by means of threaded rods 26 suitably secured to the arms 24 and adapted to be actuated by means of a gear system 27 and 28 preferably operative by the hand wheel 29, as will be apparent.

30 designates an arm secured to one of the bracket arms 24 and extending outwardly from the frame 1 to serve as a support for the rod 31 and also as a bearing for the threaded feed spindle 32, while a second support for these members is provided in the arm 33 which is preferably formed integral with an extension 34 secured to one of the bracket arms 24. The threaded spindle 32 serves as a feed screw for moving the carrier frame of the material relative to the punching mechanism and is an accurate and positive means for performing the desired function.

34ˣ designates a sleeve preferably slotted throughout its length within which the threaded spindle 32 is located and upon which the material carrying frame is mounted for sliding movement, it being understood that the sleeve 34ˣ does not rotate but is fixed relative to the threaded spindle 32. The carrier frame comprises a sleeve 35 secured by a spline or key 35ˣ for sliding movement thereon and by means of which the two sleeves 34ˣ and 35 may be turned relative to the threaded spindle 32 at certain times to shift the material carrier toward and away from the punching mechanism.

36 designates a hanger preferably tubular fixedly secured to and adjacent each end of the sleeve 35 and having a plunger 37 slidingly mounted therein and normally outwardly pressed through the medium of a spring 37ˣ. These plungers 37 are adapted to carry the punching material by means of a clamping device comprising a plate 38 preferably resting on the bed 21 and having apertured ears 39 in which a rod 40 is secured to attach the same to the plungers 37. Coacting with the plate 38 are a plurality of gripping members comprising jaws 41 carried by the rod 40 and adapted to be shifted by the lever 42 into engagement with the material 43. In this position the thumb screw clamping means 44 is brought into operation to securely grip and retain the material firmly in position on the carrier frame. It will thus be apparent that the sleeve 35, the hangers 36, plungers 37 and plate 28 with its gripping devices form a carrier frame which has free sliding movement longitudinally of the slotted sleeve 34ˣ. The longitudinal movement of this carrier frame causes the material to assume different positions relative to the punching mechanism and in order that this movement may properly position the material for successive punching operations, I preferably provide a step by step mechanism which accurately determines the relation between the parts. This step by step mechanism consists, in the present instance, of a plurality of collars 45 mounted upon the sleeve 35 at suitable intervals apart and, in the present instance, these collars are split and provided with a bolt 46 or like fastening means by which they are securely locked in position. As here shown, the collars 45 are each provided with oppositely inclined faces 47 and 48 between which a slot 49 is formed to accommodate a stop finger 50 and the function of the inclined faces is substantially that of a cam which causes a suitable cooperating member, presently to be described, to be actuated and operate its adjuncts. It will be understood that there is one stop finger 50 for each collar and these fingers are all mounted upon a spindle 51 mounted for reciprocating movement in a suitable portion of the carrier frame.

The feeding movement of the carrier frame and its adjuncts, the collars 45 and fingers 50, is effected, in the present instance, by means of a leader-nut 52 positioned within the slot of the sleeve 34ˣ and in engagement with the threaded spindle 32. This leader-nut 52 has a link 53 secured thereto slidingly mounted in the bearing 54 and connected to a bell crank lever 55 which is normally held by a spring 56 to cause the leader-nut 52 to engage the threaded feed-spindle 32. In order to release the leader-nut 52 a link 57 is secured at one end to the bell-crank 55 and at its opposite end to a hand-lever 58 and in which position the parts may be locked by means of a spring catch 59, as will be apparent.

In the operation of the machine the leader-nut 52 is thrown into engagement with the threaded feed-spindle 32 and the carrier frame thus moves longitudinally the distance required to punch the width of the material or so much of the same as may be desired, and of course it will be seen that some means must be provided to release the feeding mechanism from the carrier frame during the interval of time that a punching operation is taking place. For this purpose I preferably provide a friction drive, for actuating the threaded spindle 32, consisting of a pair of friction cones 60 and 61, the former being rotatably secured to a drive shaft 62 while the latter is loosely mounted on said shaft 62 and held in frictional engagement with the cone 60 by means of a spring 63, the tension of which may be regulated by the adjusting nuts 64. The cone 61 has secured thereto a sprocket 65 which drives, through the medium of a chain 66, a second sprocket 67 keyed to the threaded spindle 32. It will thus be apparent that if the carrier frame is held against movement the friction between the two cones will be overcome and the feeding operation cease during this interval but will immediately resume as soon as the carrier frame is released.

In order to effect the stopping of the carrier frame at the desired intervals, I preferably provide a controlling block 68 having, in the present instance, a curved face 69 conforming substantially to the contour of the collars 45 with respect to which it is located in the path of movement thereof. This controlling block 68 is slidingly mounted on a supporting member 70 and is normally maintained in position to be engaged by the collars 45 through the medium of springs 71 which are located in apertures 72 and 73 formed respectively in the member 70 and block 68. The supporting member 70 is carried by the rod 31 and is prevented from rotary movement relative thereto by means of a key 74 but may have free sliding movement longitudinally of said rod, for a purpose to be presently described, though of course it will be understood that suitable means are provided for locking the supporting member to prevent sliding movement at improper times. The coöperative action between the block 68 and the carrier frame will now be apparent since as soon as the first collar 45 contacts with the block 68, said block will ride on the cam face 47 and come into engagement with the stop finger 50 which in normal position is raised as shown in Fig. 20 and therefore the carrier frame will come to rest until a punching operation is effected, after which the spindle 51 is oscillated to shift the stop finger 50 out of the path of the block 68 and release the carrier frame so that the feeding movement again takes place until the next collar is reached.

The movement of the spindle 51 to effect the withdrawal of the stop fingers 50 is accomplished by providing a slot 75 in a portion of the hanger 36 which supports the spindle at each end in which slot said spindle has a sliding movement though normally it is held outwardly pressed by a plunger 76 actuated by springs 77 which latter are controlled by thumb screws 78.

79 designates an arm fixedly secured to a spindle 80, which forms a part of the carrier frame and having a pawl 81 secured thereto and normally positioned to engage the spindle 51 it being noted that there are two of these pawls one at each end of the spindle 80 whereby the proper movement of the spindle 51 is accomplished.

82 designates a link connected at one end to the arm 79 and secured at its other end to a bell crank 83 having, in the present instance, an operating handle 84 integral therewith and whereby the arm 79 is shifted to bring the cam face of the pawl 81 into engagement with the spindle 51 and cause the same to move against the tension of the springs 77 and thus draw the stop fingers 50 into the slots 49 of the collars 45 and out of alinement with the block 68.

The function of the block 68 as has already been explained, is to locate the material with respect to the punch by a step by step movement and in view of the fact, in this class of work, that the punches are made in rows staggered with respect to each other, it becomes necessary to provide some means for varying the position of the block 68 after each row of punches. Thus when the material carrying frame has reached the end of its stroke and a second row of punching is to be made, the relation between the block 68 and the carrier frame must be changed in order to secure the staggered effect. In the present instance, this change is effected by means of the sliding supporting member 70 in which the block 68 is mounted and the travel of the member 70 is limited in either direction by means of stops 85 one located on either side of the member 70 and fixedly secured to the rod 31 by means of a key 85$^x$ and set screw 86. Each of these stops 85 is provided with a plunger 87 normally held outwardly pressed, as shown in Fig. 26, through the medium of a spring 88.

The plungers 87 are each provided with a roller 89, in the present instance, projecting laterally through an opening 90 in the side of the stops 85 and into the path of movement of riders 91 secured to a shift bar 92 by means of which the plungers 87 are retracted at certain times to permit actuation of adjacent parts. These riders 91 are each provided with a double inclined cam face 93 adapted to engage the roller 89 adjacent thereto and by which the plungers are moved as the bar 92 is shifted in either direction.

94 designates a locking bar carried by and between the riders 91 with recesses 95 and a seat 96 with the former of which the plungers 87 are adapted to engage while in the latter the supporting member 70 is located and thereby moves with it when the riders 91 are moved. It will thus be apparent after a row of punching has been made with the parts in the position as shown in Fig. 28 that the bar 92 is shifted to move the supporting member 70, its block 68 and other adjuncts to the position shown in Figs. 26 and 27, so that the next row of punches is staggered with respect to the previous one.

The locking of the parts in the position just described takes place automatically through the action of the cam faces 93 of the riders 91 since when the bar 92 is shifted in one direction one of the cam faces 93 contacts with the roller 89, adjacent thereto, and raises the plunger 87 out of the path of the bar 94 and at the end of the movement the plunger 87 snaps over the other side of this rider 91 into the recess 95 and locks the parts, as will be obvious.

The shift bar 92 is operated, in the present instance, through the medium of a lug 97 adjustably mounted on the said bar 92 and adapted to be engaged by an arm 146, hereinafter described, which is carried by the sleeve 35 of carrier frame, it of course being understood that this lug is positioned at a suitable point to cause the shifting of the parts at the desired time in one direction. The movement of the shift bar 92 in the opposite direction is effected by a lug 98 secured adjacent the opposite end of the shift bar 92. It will be understood that the lugs 97 and 98 are secured to the shift bar by set screws 99 or like fastening devices whereby they may be adjusted as desired.

The lug 98 is located in the path of movement of a block 100 slidingly mounted on a bar 101 of an auxiliary frame 102 and movement thereof is controlled by means of a trigger 103 projecting into the path of movement of a finger 104 secured to a portion of one of the hangers 36 of the carrier frame.

During the return stroke of the carrier frame it will of course be necessary, if no punching is to be done, to provide some means for removing the block 68 from the path of movement of the stop fingers 50 and for this purpose I have, in the present instance, provided a cam member 105 preferably secured to the collar 45, adjacent the end of the carrier frame, which controls the last punched hole of a row. This cam member 105, as shown in Fig. 18, engages the block 68 and forces the same backward against the tension of the springs 71 and beyond the ends of the stop fingers 50, in which position it is held, as here shown, by a lever 106 having a shoulder 107 formed thereon which is adapted to be engaged by a pin 108 fixed to the block 68 and held in locked position by means of a spring 109.

The parts just described perform the function of a catch to retain the parts out of position for a predetermined length of time. The locking catch is released, in the present instance, by a tongue 110 having a slot 111 therein, by which it is adjustably connected by screws 112 to the lever 106, and having also a cam face 113 adapted to be engaged by a trip 113ˣ, suitably positioned on the carrier frame, at or near the end of the return stroke of the said frame. The engagement of this trip 113ˣ with the cam face 113 turns the lever 106, as here shown, in a clock-wise direction thus releasing the shoulder 107 and permitting the block 68 to return to normal operative position.

It will of course be seen that the step by step mechanism may operate in either direction and thus punch a row in the material on the return stroke as well as on the forward stroke, the only change necessary being the removal of the cam member 105 so that the block 68 is never pressed out of the path of movement of the stop fingers 50.

In connection with the block 68 it will be noted that I have preferably utilized its movement to effect the throwing of the stamping clutch mechanism into operation and I accomplish this end by providing a pawl 114, preferably pivoted, in a recess 115, of the said block 68, and held in operative position by means of a spring 116 suitably secured to the said block. This pawl 114 engages a lug 118 fixedly secured to a rod 119 mounted for oscillatory movement in arms 119ˣ carried by the bed frame 24. 120 designates an arm fixedly secured to the rod 119 and having attached thereto one end of a rod 121 which connects through a link 122 with the lever 19 which actuates the cam roller 5. Thus each time the block 68 moves through engagement with one of the collars 45 the pawl 114 partially rotates the rod 119 and releases the punching mechanism as heretofore described. On the return movement of the block 68 the pawl 114 rides beneath the lug 118 and snaps into another operative position by the action of the spring 116. A spring 123 is also secured to the arm 120 and a fixed part of the frame whereby the rod 119 is returned to normal position ready to be engaged by another operative movement of the pawl 114.

Referring now to the resetting mechanism for the step by step mechanism it will be noted that the trigger 103 is normally maintained retracted out of the path of movement of the finger 104 by means of a spring 124 preferably secured at one end to an extension 125 of the block 100. It will be noted that the trigger 103, in the present instance, forms an integral part of a plate 106 pivoted at 127 to the block 100 and that a lug 128 is carried by the plate 126 and projects into the path of movement of a star-wheel 129 suitably pivoted adjacent thereto. It will thus be apparent that rotation of the star-wheel 129 causes the plate 126 and trigger 103 to move in one direction while the spring 124 returns the same to normal position and this return movement is limited, in the present instance, by a pin 129ˣ suitably secured to the block 100 and in the path of movement of the plate 126.

130 designates a detent slidingly mounted in suitable guides of the plate 126 and secured thereto by means of a screw 131 passing through a slot 132 in the said detent whereby relative movement between the two parts is permitted. A spring 133 is secured to the detent 130 and is fastened at its opposite end to the block 100 whereby the said detent is normally maintained in the position shown in Fig. 30. In order to properly actuate the detent at certain times I preferably provide a finger 134 suitably secured to the frame 102 and having a cam face 135 adapted to engage a pin 136 secured to or forming a part of the detent 130. The star-wheel 129 is actuated by a ratchet 137 secured thereto and with which a pawl 138 engages and moves the same at certain predetermined times. This pawl 138 is suitably pivoted at 139 to a bracket 140 and is held in engagement with the ratchet 129 by means of the spring 141.

142 designates a spring pressed pawl suitably positioned to engage the ratchet 137 at all times and prevent reverse movement thereof, as will be understood. The bracket 140 is adjustably mounted on a shift bar 143 operated by parts presently to be described and forming a means for controlling the operation of the main carriage feeding clutch mechanism. The trigger mechanism 103 and its adjuncts serve as a means to actuate the shift bar 92 after every alternate feeding movement of the carrier frame, that is to say, assuming the block 68 to be in the position shown in Fig. 28, the carrier frame will travel forwardly punching a row of holes and at the end of its stroke the block 68 is shifted to the position shown in Fig. 27, as previously explained, and thereupon the carrier frame automatically reverses and returns. During the reversing operation the shift bar 143 is operated and causes the star wheel to move one tooth of the ratchet 137 and thereby bring the lug 128 opposite the space between two of the teeth of the star-wheel. This action permits the trigger 103 to be withdrawn out of the path of the finger 104 and the carrier frame returns without these parts coming into contact. At the completion of the return stroke of the carrier frame the machine again automatically reverses and another forward movement of the carrier frame takes place punching a second row of holes, as shown in Fig. 8, staggered with relation to the first row. At the end of this stroke the shift bar 143 again causes the star wheel 129 to turn and this time one of its teeth contacts with the lug 128, as shown in Fig. 29, thus throwing the trigger 103 outwardly and holding it in this position to be engaged by the finger 104. As soon as this engagement takes place, the block 100 is released from frictional engagement with the spring 144 and moves to the right, as shown in Fig. 30, thereby engaging the rider 99 and shifting the bar 92 to return the block 68 to its original position, as already explained. At the next forward movement of the carrier frame the detent 130 is engaged by the finger 104 and the block 100 brought back to the left side of the bar 101, as shown in Fig. 32, it of course being released automatically by the pin 136 riding up the cam face 135 of the finger 134 and the operation is again ready to be repeated.

The shift bar 143 carries a pair of riders 145 adjustably mounted thereon and suitably positioned to cause actuation thereof at a predetermined time, and adapted to be engaged by the arm 146, preferably forked, carried by the sleeve 35 and by which the carrier frame automatically effects operation of the trigger mechanism just described. The reversing mechanism is also actuated by the movement of this shift bar 143 and for this purpose a pair of riders 147 are adjustably mounted thereon and positioned at predetermined points to engage suitable actuating means of the reversing mechanism. These riders are preferably formed with extension lugs 148 to insure their proper operation and are also provided with set screws justably mounted thereon and positioned at The reversing mechanism is preferably mounted on a bracket 150 secured to the main frame of the machine and which bracket carries journals 150$^x$ for the main feed shaft 62.

151 designates a slotted clutch member, keyed to the shaft 62 and slidable with respect thereto, having clutch faces 152 and adapted to be actuated, in the present instance, by means of a bifurcated lever 153 carrying rollers 154 seated within the slotted portion of the said clutch member 151. This lever 153 is preferably pivoted at 155 on the bracket 150 and preferably forms a part of a frame 156 preferably of rectangular form and having end plates 157 to each of which, as here shown, is pivoted an arm 158 normally under the tension of the spring 159 whereby these arms are swung automatically to operative position. Each of these arms 158 carries a cam roller 160 adapted to be brought into engagement with the respective cam face 161 formed integral or secured to each of the forward and reverse gears 162 and 162$^x$. These driving gears are loosely mounted on the shaft 62 and are provided with clutch faces 163 adapted to be engaged by the clutch faces 152 of the member 151. The arms 158 are preferably provided with a cutaway portion 164 forming a projecting tongue 165 which is located adjacent to and in position to be engaged by locking catches 166 and 167 located in pairs in close proximity to each other and on opposite sides of the reversing mechanism and which serve to retain the cam rollers 160 normally retracted. These locking catches are each provided with a pin 168 which preferably project a sufficient distance to be engaged by the lugs 148 of the riders 147 during a shifting movement of the bar 143. In order to retain these catches 166 and 167 in normal position springs 169 are provided and each spring is secured at its ends to oppositely disposed pairs of the catches. It will further be noted that these catches 166 and 167 have their faces which engage the tongue 165 inclined, as shown at 170, whereby the arms 158 are retracted during a movement of the frame 156 in an upward direction.

171 designates pins suitably positioned on the frame 156 whereby the inward swinging movement of the arms 158 is limited.

Referring to Fig. 33 of the drawings the arm 158, at the left, is shown retained back of the upper catch 167 while a corresponding arm at the opposite side is retained by the lower of the catches 166 both rollers 160 being at this time held out of operative position. As soon, however, as the shift bar 143 is actuated, the lug 148 of the rider 147 engages the pin 168 of the upper catch 167 thereby releasing the arm 158 and the parts assume the position shown in Fig. 35. The arm 158 being released is thrown by its spring 159 into the path of movement of the cam 161 on the reverse gear 162$^x$ which at this time is rotating loosely on the shaft 62, it being assumed that the parts are in the position shown in Fig. 33 with the clutch 151 engaging the direct drive clutch 163. The engagement of the cam 161 with the roller 160 forces the same downwardly thereby shifting the frame 156 about its pivot and raising the opposite arm 158 back of the upper catch 166 in position to be released at the proper time to return the clutch 151 into engagement with the forward drive mechanism, it of course being understood that this clutch is shifted by the movement of the frame 156. The direct drive gear 162 is driven, in the present instance, through the medium of a chain of gears 172, 173 and 174, the latter gear being mounted on a countershaft 175 which is rotatably supported in the bracket 176 secured to the main frame 1, while the intermediate gears are carried by a post 177 suitably secured to the arm 150. The reverse gear 162$^x$ is driven by a chain of gears 178, 179, 180 and 181, the latter being fixedly secured to the countershaft 175 while the intermediate gears are suitably mounted on stud shafts 182, 183 and 184. It will be understood that an extra gear is necessary in this chain in order to obtain the correct reversing action. The countershaft 175 carries a gear 185 meshing with a similar gear 186 on the shaft 187 this latter being rotatably mounted in the main frame 1 and carrying thereon a sprocket 188 driven by the chain 189 from the sprocket 190 fixedly secured to the driven pulley 3, as will be apparent. It will thus be seen that the gears 162 and 162$^x$ are both rotating freely in opposite directions on the shaft 62 while the pulley 3 is in operation and the movement of one or the other of them is communicated to the shaft 62 whenever the clutch 151 is thrown into one direction or the other.

It is preferable in a machine of this type to provide a means for trimming the punched edge of the material and for this purpose I have provided, in the present instance, a plurality of cutters 191 and 192 suitably mounted in an opening 193 in the table bed 21 and positioned with their cutting edges in coöperative relation and proper position to engage the material during the punching operation. The cutter 192, in the present instance, is suitably mounted on a spindle 194 which carries a gear 195 meshing with a similar gear 196 on the spindle 197 carrying the cutter 191. This spindle 197 also has mounted thereon a beveled gear 198 in mesh with a beveled gear 199 on the spindle 200 which is suitably mounted in bearings 201 of the machine bed.

202 designates a beveled gear fixedly secured to the spindle 200 and meshing with a similar gear 203 and carried by a stud shaft 204 preferably mounted in the bracket 205 which is, in the present instance, supported on the shaft 200. The stud shaft 204 carries a cotter-pin 206 passing transversely therethrough and projecting on either side into engagement with a sleeve 207 in which is mounted for longitudinal adjustment a rod 208 having a longitudinal slot 209 cut therein with which a set screw 210 is adapted to engage, it being noted that the set screw is secured to the sleeve 207. This construction permits the rod 208 to be moved from one position to another if desired and the length varied.

211 designates a beveled gear fixedly secured to the rod 208 and in mesh with a similar gear 212 fixedly secured to the shaft 62 whereby power is transmitted therefrom to the cutters 191 and 192. A guide bracket 213 is suspended from the shaft 52 and carries the end of the rod 208, as will be apparent. It will thus be obvious that the continuous rotation of the shaft 62 produces a similar motion to the cutters and as they are normally in engagement with the material the rough unpunched edge thereof is severed during the punching operation.

Having now described the longitudinal movement of the carrier frame with reference to the main frame of the machine and also having described the step by step actuating mechanism therefor and all of its component parts, reference will now be had to the means for moving the carrier frame toward and away from the main frame of the stamping mechanism.

Referring to Fig. 10 of the drawings it will be apparent that the carrier supporting sleeve 35 and the slotted sleeve 34 being keyed together may be turned about the feed screw 32 and thus vary the distance of the plate 38 and its gripping devices 44 from the punching tool. Since the material 43 is carried by this mechanism it may thus be moved toward or away from the punching tool although, as a matter of fact, its movement in normal operation is always toward the punch and its position relative thereto is determined by means of an angle stop 214 which is adjustably mounted on the bed 21 by means of bolts 215 or the like. In order to prevent turning movement of the carrier frame about the feed screw 32 during its longitudinal feeding movement, I preferably provide a locking device consisting of a collar 216 mounted adjacent one end of the slotted sleeve 34× and keyed to the same by means of the spline 35× already described. This collar 216 is mounted, in the present instance, in a clamp member comprising cap-plates 217 suitably secured together by a bole 218 or like fastening devices and secured about the rod 31. These plates are secured together at one end, in the present instance, by means of a tongue 219 preferably integral with one of the plates and passing through a slot 220 of the other plate and carrying a pin 221 which projects on either side thereof to prevent the parts being disconnected but permitting relative movement therebetween. The opposite end of one plate has pivoted thereto an arm 222 forming a grasping handle and provided with an inclined face 223 adapted to contact with a similar face 224 on the opposite plate, it being noted that the arm 222 is bifurcated to effect the desired end. Thus when the parts are in the position shown in Fig. 22 the two plates 217 are firmly clamped together and bind the collar 216 so that no movement thereof can take place and consequently the slotted sleeve 34× is held fast and the carrier frame is locked so that the same cannot turn on the feed screw 32. After the material has been punched throughout its width, as indicated by the first row in Fig. 8, the lever 222 is pulled forward thus releasing the plates 217 and permitting the carrier frame to swing about the threaded spindle 32 and thus advance the material until the trimmed edge thereof contacts with the angle stop 214. At this time the material is in position for another punching operation and a second row of punchings is stamped from the material staggered with respect to the first row as illustrated in Fig. 8. In Fig. 9 the result of the action of the trimming cutters is shown.

The operation of the machine is as follows:—A sheet of material from which the articles are to be punched is properly positioned on the bed 21 and secured in position through the medium of the gripping and clamping members 41 which form a part of the carrier frame and since the clamp 217 is in release position, the carrier frame can be swung to advance the material into contact with the angle plate 214. This clamp 217 is now locked and the carrier frame is ready for longitudinal movement to effect successive punching of the material. The driven pulley 3 is normally rotating continuously and therefore drives the two gears 162 and 162× so that engagement of the clutch 151 causes the shaft 62 to turn and transmit its motion through the friction cones 60 and 61, chain 66 and sprocket 67 to the feed screw 32. Before bringing the feeding mechanism into operation the controlling block 68 and its adjuncts are properly adjusted on the supporting rod 31 with respect to the collars 45 so that the required step by step movement of the carrier frame may be properly effected. It will likewise be understood that the several riders 99, 145 and 147 carried by the bars 92 and 143 are fixed in position to cause operation of the parts controlled by them at the proper time. The lever 58 is now operated to move the leader-nut 52 into engagement with the feed screw 32 and the carrier frame thereupon begins its travel along the sleeve 34×. Stop fingers 50 are in normal position, as shown in Fig. 10, and as soon as the first of the collars reaches the controlling block 68 its cam face forces the said block and brings it into the path of movement of the first of the stop fingers 50. The abutting action of these members overcomes the friction of the driving cones 60 and 61 and brings the feed screw 32 to rest whereby the carrier frame stops its feeding movement and a punching operation takes place. Simultaneously with this action the controlling block 68 in its backward movement presses the pawl 114 against the lug 118 thus oscillating the arm 126 and causing the cam roller 5 to be shifted so that the clutching mechanism controlling the punch is operated. As soon as this punching step has been completed the operator moves the lever 83 thereby shifting the rod 51 so as to draw the stop fingers 50 into the slots 49 and out of engagement with the block 68. The braking tension on the feed screw 32 is therefore removed and the friction driving means again rotates the same and the carrier frame feeds longitudinally until the next collar 45 contacts with the controlling block 68 when the operation just described is repeated. It will of course be understood that the lever 83 is only held momentarily to withdraw the stop finger 50 and that after it is released these stops return to normal position. In this manner the carrier frame moves from one end of the machine to the other, or for such a distance as is necessary for the number of punchings desired, and when the last of the collars 45 has traveled across the end of the block 68 the cam member 105 contacts with the said block and moves it still farther back so that the catch 108 is engaged by the slot 107 thereby holding the block 68 retracted in order to permit the carrier frame to have an unobstructed path during the return movement. The carrier frame continues its travel until the forked arm 146 engages the riders 97 and 145 thereby causing the two shift bars 92 and 143 to be moved to the left, as shown in Fig. 10. The movement of the bar 92 releases the supporting member 70 of the controlling block 68 and moves the same to a new position as shown in Fig. 27, whereby the position of the punching material is varied with respect to the punching tool and the next row of punching is staggered with respect to the first. The movement of the bar 143 has the double function of reversing the machine and setting the trip and resetting mechanism for shifting the bar 92 in the opposite direction. The setting of the trip and resetting mechanism is accomplished by means of the pawl 138 moving the star-wheel 129 so as to contact with the lug 128 so as to project the finger 103 at the desired time into the path of movement of the finger 104 of the carrier frame.

The reversing of the feed mechanism is effected by one of the riders 147 engaging the pin 168 and thus releasing the arm 158 held by the catch of which this pin 168 forms a part. The cam roller 160 of this arm 158 is thereupon brought into the path of movement of the cam 161 which causes the frame 156 to swing about its pivot 155 and shift the clutch 151 into engagement with the reverse gear 162×. The carrier frame is now fed in the opposite direction until all of the step by step collars 45 have passed the controlling block 68 whereupon the finger 113× strikes the cam face 113 of the lever 106 and releases the shoulder 107 from locking engagement with the block 68. As soon as this takes place the forked arm 146 strikes the second rider 147 and causes the clutch 151 to be released from the reverse gear 162× and shifts it into engagement with the direct drive gear 162 whereupon the carrier frame again begins its step by step movement and a second row of punchings is stamped out. The travel of the carrier frame and its operation are just as previously explained for the last cycle of operations except in this instance the arm 146 does not engage the rider 97 for the reason that the bar 92 has not as yet been shifted back to its first position. The bar 143 is, however, shifted as before to reverse the mechanism and on this movement the star-wheel 129 engages the lug 128 thereby swinging the finger 103 into the path of movement of the finger 104 so that as soon as these fingers come into engagement the block 100 is moved, to the right as shown in Fig. 32, and into contact with the rider 98 and causes the bar 92 to return to its first position thus shifting the supporting member 70 to its original position at the right, as shown in Fig. 28. The parts are now in position for another step by step feeding movement of the carrier frame in order to punch a row staggered with respect to the previous one and the cycle of operation is repeated accurately, positively and substantially automatically.

It will now be apparent that I have devised a complete, unitary structure well adapted for the purpose intended and in which automatic action and regulation takes place as an important feature of the operation of stamping articles from a sheet of material and in which row after row of punchings may be stamped in staggered relation in either direction of movement of the frame carrying the material.

It will be apparent that I have devised a novel and useful construction of a stamping machine which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:

1. The combination of a stamping machine with a material carrier frame, means controlled by said machine for feeding said carrier frame longitudinally of said machine and a step by step mechanism adapted to intermittently disengage said feeding means.

2. The combination of a stamping machine with a material carrier frame mounted thereon, a main feed driving shaft operable continuously, rotatable means connected to said shaft for feeding said carrier frame longitudinally of said machine, and means to intermittently disengage said feeding means from action.

3. The combination of a stamping machine with a material carrier frame mounted thereon, a main feed shaft operable continuously, a friction driving means carried by said shaft, means driven by said friction device to feed said carrier longitudinally of said machine, and means to intermittently overcome the driving friction of said friction means and disengage said feeding means during the stamping action.

4. The combination of a stamping machine with a feed screw rotatably mounted thereon, a material carrier frame mounted for longitudinal movement with respect to said feed screw, driving means for said feed screw, and means to intermittently drive said feed screw whereby a step by step movement of said carrier frame is effected.

5. The combination of a stamping machine with a material carrier frame mounted thereon, feeding mechanism adapted to be operated intermittently to effect a step by step movement of said carrier frame longitudinally of said machine, means to automatically reverse the direction of feeding movement of said frame, and means to vary the step by step movement of said carrier frame for successive feeding operations.

6. The combination of a stamping machine with a carrier frame mounted thereon, means to feed said carrier frame longitudinally of said machine, a step by step mechanism for intermittently disengaging said feeding means and stopping the movement of said carrier, and means for automatically varying the time of operation of said step by step mechanism.

7. The combination of a stamping machine with a material carrier frame mounted thereon, means to feed said frame longitudinally of said machine, a plurality of stops carried by said frame, a controlling block mounted adjacent thereto and adapted to engage therewith to effect a step by step movement of said carrier frame, and means operated by the movement of said carrier frame for varying the relation between said stops and said block.

8. In a stamping machine, a main frame, a punching mechanism carried thereby, a feed screw rotatably mounted in said frame, a material carrier frame mounted for longitudinal movement on said feed screw, driving mechanism operatively connected to said feed screw, means to transmit motion of said feed screw to said carrier frame to produce longitudinal movement of the latter, a step by step mechanism controlling the movement of said carrier frame, and means operated by the movement of said carrier frame for operating said punching mechanism intermittently.

9. In a stamping machine, a main frame, a punching mechanism carried thereby, a feed screw rotatably mounted in said frame, a material carrier frame mounted for longitudinal movement of said feed screw, a driving mechanism for rotating said feed screw, means to transmit motion from said feed screw to said carrier frame, a step by step mechanism for controlling the movement of said carrier frame, means operated by the movement of said carrier frame for operating said stamping mechanism intermittently, and means for automatically reversing said feed screw driving means.

10. In a stamping machine, a main frame, a punching mechanism carried thereby, a feed screw rotatably mounted in said frame, a material carrier frame mounted for longitudinal movement on said feed screw, means between said feed screw and carrier frame to transmit movement to said latter, a plurality of stops carried by said frame, a controlling block movably mounted adjacent said frame in the path of movement of said stops and means operated by the movement of said carrier frame for shifting said block alternately in opposite directions to vary the relation with said stops, and means operated by the movement of said carrier frame for actuating said stamping mechanism.

11. In a stamping machine, a reversing mechanism comprising a driven shaft, a plurality of gears loosely mounted thereon and each provided with clutch faces, a driving shaft having connections with said gears to drive the same respectively in opposite directions, a clutch slidingly mounted and keyed to said driven shaft, and means operated by said stamping machine for shifting said clutch to alternately engage said gears.

12. In a stamping machine, a reversing mechanism comprising a driven shaft, a plurality of gears loosely mounted thereon, a driving shaft having connections with said gears to drive them respectively in opposite directions, clutch and cam faces on each of said gears, a clutch slidingly mounted and keyed to said driven shaft, a frame pivotally mounted adjacent said clutch and operatively connected thereto, a spring pressed arm pivotally mounted on said frame adjacent each gear cam face, a cam roller on each arm, catch members adapted to engage said arms and retain said rollers out of engagement with said cam faces and a trip mechanism operated by said stamping machine for alternately releasing said catches whereby said clutch is shifted to alternately engage said gear clutch faces.

13. The combination of a stamping machine with a material carrier frame mounted thereon, a plurality of stop fingers carried by said frame, a controlling block located adjacent said fingers and in the path of movement thereof and adapted to act as a stop for said carrier frame, means to disengage said block to release the same from engaging action, and means controlled by said machine for feeding said carrier frame in opposite directions.

14. The combination of a stamping machine with a material carrier frame mounted thereon, of a plurality of fingers carried by said frame, a controlling block located adjacent said fingers and in the path of movement thereof, and adapted to act as a stop for said carrier frame, means to shift the finger engaging said block to release said carrier frame, and means controlled by said machine for feeding said carrier frame in opposite directions.

15. The combination of a stamping machine with a material carrier frame mounted thereon, of a plurality of fingers carried by said frame, a controlling block located adjacent said fingers and in the path of movement thereof and adapted to act as a stop for said carrier frame, means for successively releasing said fingers from said controlling block, whereby a step by step movement of said carrier frame is effected, and means controlled by said machine for feeding said carrier frame in opposite directions.

16. The combination of a stamping machine with a material carrier frame mounted thereon, a plurality of stop fingers carried by said frame, a controlling block located adjacent said fingers and in the path of movement thereof, means controlled by said machine for feeding said carrier frame in opposite directions, a stamping mechanism, and means intermittently actuated by the movement of said carrier frame to actuate said stamping mechanism.

17. The combination of a stamping machine with a material carrier frame mounted thereon, a plurality of stop fingers carried by said frame, a controlling block located adjacent said fingers and in the path of movement thereof, means controlled by said machine for feeding said carrier frame in opposite directions, a stamping mechanism, and means actuated by the movement of said carrier frame for shifting said controlling block to cause the actuation of said stamping mechanism.

18. The combination of a stamping machine with a material carrier frame mounted thereon, a plurality of stop fingers carried by said frame, a controlling block located adjacent said fingers and in the path of movement thereof, means controlled by said machine for feeding said carrier frame in opposite directions, a stamping mechanism, actuating connections between said controlling block and said stamping mechanism, and means actuated by the movement of said carrier frame to shift said controlling block intermittently to operate said stamping mechanism.

19. The combination of a stamping machine with a material carrier frame thereon, a plurality of stop fingers carried by said frame, a controlling block located adjacent said fingers and in the path of movement thereof, means controlled by said machine for feeding said carrier frame in opposite directions, and means to lock said controlling block out of the path of movement of said fingers in one direction of movement of said carrier frame.

20. The combination of a stamping machine with a material carrier frame, a plurality of stop fingers carried thereby, a controlling block located adjacent thereto and in the path of movement thereof, a cam member secured adjacent each stop finger and adapted to shift said controlling block to actuate said stamping machine, means controlled by said machine for feeding said carrier frame in opposite directions, and means to shift the stop finger engaging said block to release said carrier frame.

21. The combination of a stamping machine with a material carrier frame, a plurality of stop fingers carried thereby, a controlling block located adjacent thereto and in the path of movement thereof, a cam member secured adjacent each stop finger and adapted to shift said controlling block to actuate said stamping machine, means controlled by said machine for feeding said carrier frame in opposite directions, and means to simultaneously shift each of said stop fingers to release said carrier frame from said controlling block.

22. The combination of a stamping machine with a material carrier frame mounted thereon, a plurality of stop fingers carried thereby, a controlling block mounted adjacent said stop fingers and in the path of movement thereof, connections between said controlling block and said stamping machine, a cam member secured adjacent each stop finger and adapted to engage said controlling block to shift the same, whereby said stamping machine is actuated in opposite directions, and means to release said fingers from engagement with said controlling block.

23. The combination of a stamping machine with a material carrier frame mounted thereon, a plurality of stop fingers carried thereby, a control block mounted adjacent said fingers and in the path of movement thereof, means controlled by said machine for feeding said carrier frame in opposite directions, means to disengage said controlling block from said stop fingers, and means actuated by the movement of said carrier frame to shift said controlling block to vary its position relative to said stop fingers.

24. The combination of a stamping machine with a material carrier frame mounted thereon, a main feed driving shaft operable continuously, means connected with said shaft for feeding said carrier frame longitudinally of said machine, a plurality of stop fingers carried by said frame, a controlling block located adjacent said fingers and in the path of movement thereof, and means actuated by the engagement of said stop fingers with said controlling block for intermittently disengaging said feeding means from operable connection with said shaft.

25. The combination of a stamping machine with a material carrier frame mounted thereon, of a main feed driving shaft operable continuously, means connected to said shaft for feeding said carrier frame longitudinally of said machine, a plurality of stop fingers carried by said machine and adapted to be shifted from one position to another, a controlling block adjacent said frame and located in the path of movement of said fingers when in one position, and means actuated by the successive engagement of said stop fingers with said controlling block for disengaging said feeding means from operable connection with said shaft, whereby a step by step movement of said carrier frame is produced.

26. The combination of a stamping machine with a material carrier frame mounted thereon, of a main feed driving shaft operable continuously, means connected to said shaft for feeding said carrier frame longitudinally of said machine, a plurality of stop fingers carried by said machine and adapted to be shifted from one position to another, a controlling block adjacent said frame and located in the path of movement of said fingers when in one position, means actuated by the successive engagement of said stop fingers with said controlling block for disengaging said feeding means from operable connection with said shaft, whereby a step by step movement of said carrier frame is produced, and means to automatically reverse the direction of movement of said carrier frame.

27. The combination of a stamping machine with a material carrier frame movably mounted thereon, of a plurality of stop fingers carried thereby, a controlling block mounted adjacent said fingers and in the path of movement thereof, step by step means controlled by said machine for feeding said carrier frame in either direction, means to disengage said controlling block from said stop fingers, and means actuated by the movement of said carrier frame to shift said controlling block to vary its position relative to said stop fingers.

28. The combination of a stamping machine with a material carrier frame movably mounted thereon, of a plurality of stop fingers carried by said frame, a controlling block located adjacent said fingers in the path of movement thereof, means controlled by said machine for feeding said carrier frame in either direction, means actuated by the movement of said carrier frame to shift said controlling block to vary its position relative to said stop fingers, and means to shift said controlling block to either of its predetermined positions.

29. In a stamping machine, a main frame, a material carrier frame movably mounted thereon, a step by step mechanism for feeding said carrier frame longitudinally of said main frame, a reversing mechanism, means actuated by said carrier frame for operating said reversing mechanism at the end of each forward and rearward stroke of said carrier frame, a slidably mounted controlling block for said step by step mechanism, means actuated by said carrier frame for shifting said controlling block, said means being operable to shift said block in one direction on alternate forward movements of said frame and in the other direction on alternate rearward movements of said frame.

30. In a stamping machine, a main frame, a material carrier frame movably mounted thereon, a step by step mechanism for feeding said carrier frame longitudinally of said main frame, a reversing mechanism, means actuated by said carrier frame for operating said reversing mechanism at the end of each forward and rearward stroke of said carrier frame, a slidably mounted controlling block for said step by step mechanism, and means actuated by said carrier frame for shifting said controlling block longitudinally, said means being operable to shift said block in one direction on alternate forward movements of said frame and in the other direction on alternate rearward movements of said frame.

31. In a stamping machine, a main frame, a material carrier frame movably mounted thereon, a step by step mechanism for feeding said carrier frame longitudinally of said main frame, a reversing mechanism, a shift bar adapted to actuate said reversing mechanism, a plurality of riders carried by said shift bar located in the path of movement of said carrier frame for operating said shift bar at the end of each forward and rearward stroke of said carrier frame, a controlling block for said step by step mechanism and means actuated by said carrier frame for shifting said controlling block, said means being operable to shift said block in one direction on alternate forward movements of said frame and in the other direction on alternate rearward movement of said frame.

32. In a stamping machine, a main frame, a punching mechanism, a material carrier frame movably mounted thereon, a step by step mechanism for feeding said carrier frame longitudinally of said main frame, a reversing mechanism, means actuated by said carrier frame for operating said reversing mechanism at the end of each forward and rearward stroke of said carrier frame, a controlling block for said step by step mechanism, means actuated by said carrier frame for shifting said controlling block, said means being operable to shift said block in one direction on alternate forward movements of said frame and in the other direction on alternate rearward movements of said frame, and means operable simultaneously with said step by step mechanism for operating said punching mechanism.

33. In a stamping machine, a main frame, a punching mechanism, a material carrier frame movably mounted thereon, a step by step mechanism for feeding said carrier frame longitudinally of said main frame, a reversing mechanism, means actuated by said carrier frame for operating said reversing mechanism at the end of each forward and rearward stroke of said carrier frame, a controlling block for said step by step mechanism, means actuated by said carrier frame for shifting said controlling block longitudinally, said means being operable to shift said block in one direction on alternate forward movements of said frame and in the other direction on alternate rearward movements of said frame, and means operable simultaneously with said step by step mechanism for operating said punching mechanism.

34. In a stamping machine, a main frame, a punching mechanism, a material carrier frame movably mounted thereon, a step by step mechanism for feeding said carrier frame longitudinally of said main frame, a reversing mechanism, a shift bar adapted to actuate said reversing mechanism, a plurality of riders carried by said shift bar located in the path of movement of said carrier frame for operating said shift bar at the end of each forward and rearward stroke of said carrier frame, a controlling block for said step by step mechanism and means actuated by said carrier frame for shifting said controlling block, said means being operable to shift said block in one direction on alternate forward movements of said frame and in the other direction on alternate rearward movement of said frame, and means operable simultaneously with said step by step mechanism for operating said punching mechanism.

35. In a stamping machine, a main frame, a material carrier frame movably mounted thereon, a step by step mechanism for feeding said carrier frame longitudinally of said main frame, a reversing mechanism, a shift bar adapted to actuate said reversing mechanism, a plurality of riders carried by said shift bar located in the path of movement of said carrier frame for operating said shift bar at the end of each forward and rearward stroke of said carrier frame, a controlling block for said step by step mechanism, a shift bar situated adjacent thereto and adapted to actuate said block, riders carried by said shift bar and located in the path of movement of said carrier frame whereby said controlling block is shifted at predetermined times and resetting means for actuating said block shift bar, whereby one of said riders is engaged by said frame on alternate forward movements thereof and the other rider is engaged by said carrier frame on alternate rearward movements thereof.

36. In a stamping machine, a main frame, a punching mechanism, a material carrier frame movably mounted thereon, a step by step mechanism for feeding said carrier frame longitudinally of said main frame, a reversing mechanism, means actuated by said carrier frame for operating said reversing mechanism at the end of each forward and rearward stroke of said carrier frame, a controlling block for said step by step mechanism, means actuated by said carrier frame for shifting said controlling block, said means being operable to shift said block in one direction on alternate forward movements of said frame and in the other direction on alternate rearward movements of said frame, and means operable simultaneously with said step by step mechanism for operating said punching mechanism.

CLARENCE A. MYERS.

Witnesses:
 WM. CANER WIEDERSEIM,
 C. D. McVAY.

Copies of this patent may be obtained for five cents each, by addressing the "Commissioner of Patents, Washington, D. C."